US012578197B2

(12) United States Patent
Uang et al.

(10) Patent No.: US 12,578,197 B2
(45) Date of Patent: Mar. 17, 2026

(54) TANDEM RIDING DETECTION ON PERSONAL MOBILITY VEHICLES

(71) Applicant: Lyft, Inc., San Francisco, CA (US)

(72) Inventors: Jennifer Uang, Emeryville, CA (US); Paul Young Durkee, Pacifica, CA (US); Sachith Anurudde Dunatunga, Palo Alto, CA (US); Jens Paul Windau, San Francisco, CA (US); Garrett Korda Drayna, San Carlos, CA (US)

(73) Assignee: Lyft, Inc., San Francisco, CA (US)

( * ) Notice: Subject to any disclaimer, the term of this patent is extended or adjusted under 35 U.S.C. 154(b) by 211 days.

(21) Appl. No.: 18/174,229

(22) Filed: Feb. 24, 2023

(65) Prior Publication Data

US 2024/0288272 A1     Aug. 29, 2024

(51) Int. Cl.
*G01C 21/34* (2006.01)
(52) U.S. Cl.
CPC ..... *G01C 21/3438* (2013.01); *G01C 21/3484* (2013.01)
(58) Field of Classification Search
None
See application file for complete search history.

(56) References Cited

U.S. PATENT DOCUMENTS

| | | | |
|---|---|---|---|
| 2008/0234107 A1* | 9/2008 | Cox | A61B 5/1038 482/8 |
| 2022/0266946 A1* | 8/2022 | Hancock | B62J 45/4152 |
| 2024/0054554 A1* | 2/2024 | Xanco | G07F 17/0057 |

* cited by examiner

*Primary Examiner* — Angela Y Ortiz
*Assistant Examiner* — Laura E Linhardt
(74) *Attorney, Agent, or Firm* — Baker Botts L.L.P.

(57) ABSTRACT

In particular embodiments, a computing system may collect, for each ride of a plurality of rides, first ride data associated with a user riding a personal mobility vehicle during a certain time period. The system may calculate, for each ride, an approximate load on the personal mobility vehicle based on at least the first ride data. The system may calculate a user profile of the user based on the approximate loads. The system may collect, for a subsequent ride, second ride data associated with the user riding a current personal mobility vehicle after the certain time period. The system may calculate, for the subsequent ride, a second approximate load on the current personal mobility vehicle based on at least the second ride data. The system may compare the second approximate load to the user profile and classify the subsequent ride as individual or tandem based on the comparison.

20 Claims, 20 Drawing Sheets

400

402
404

114c

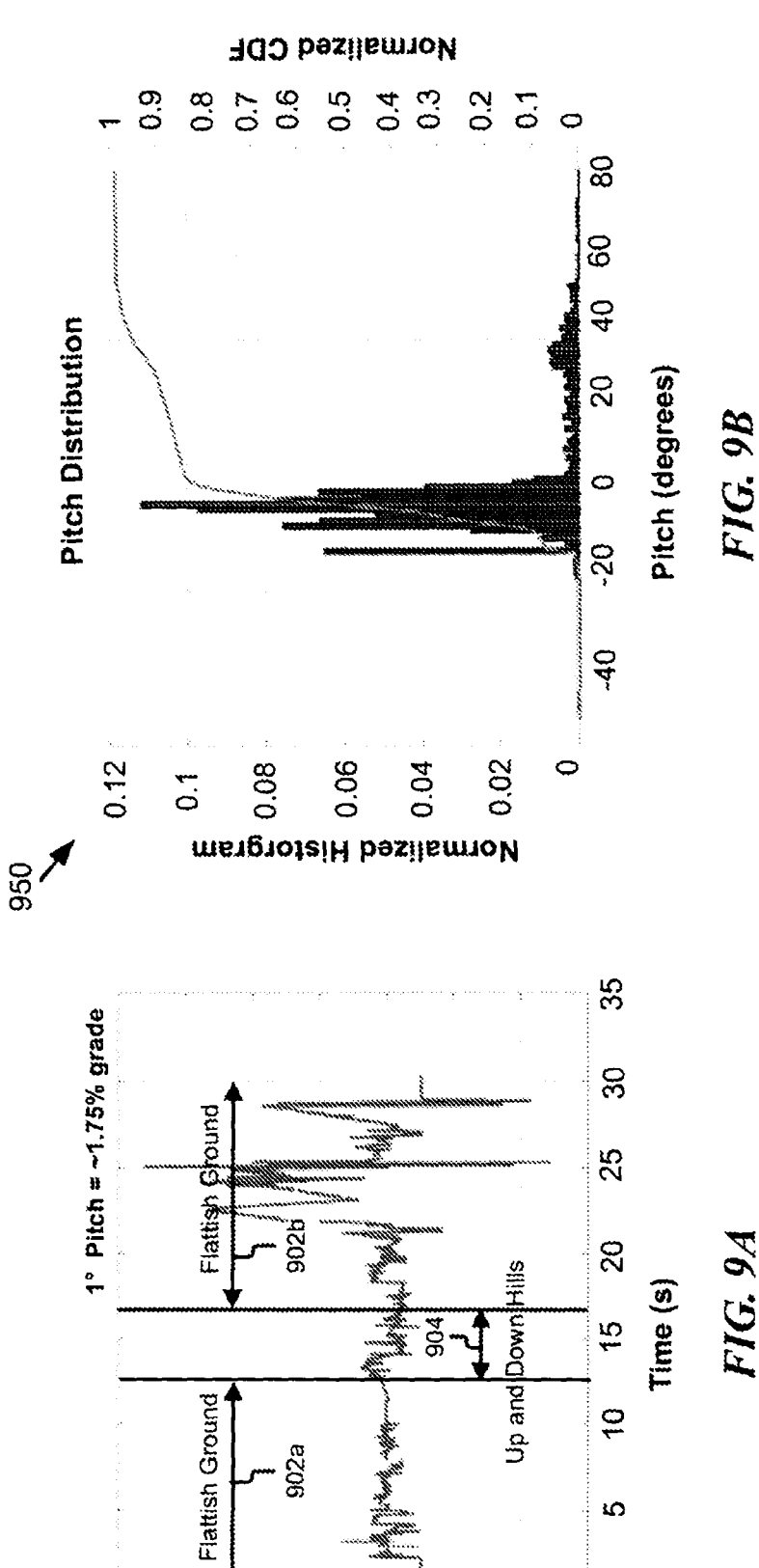

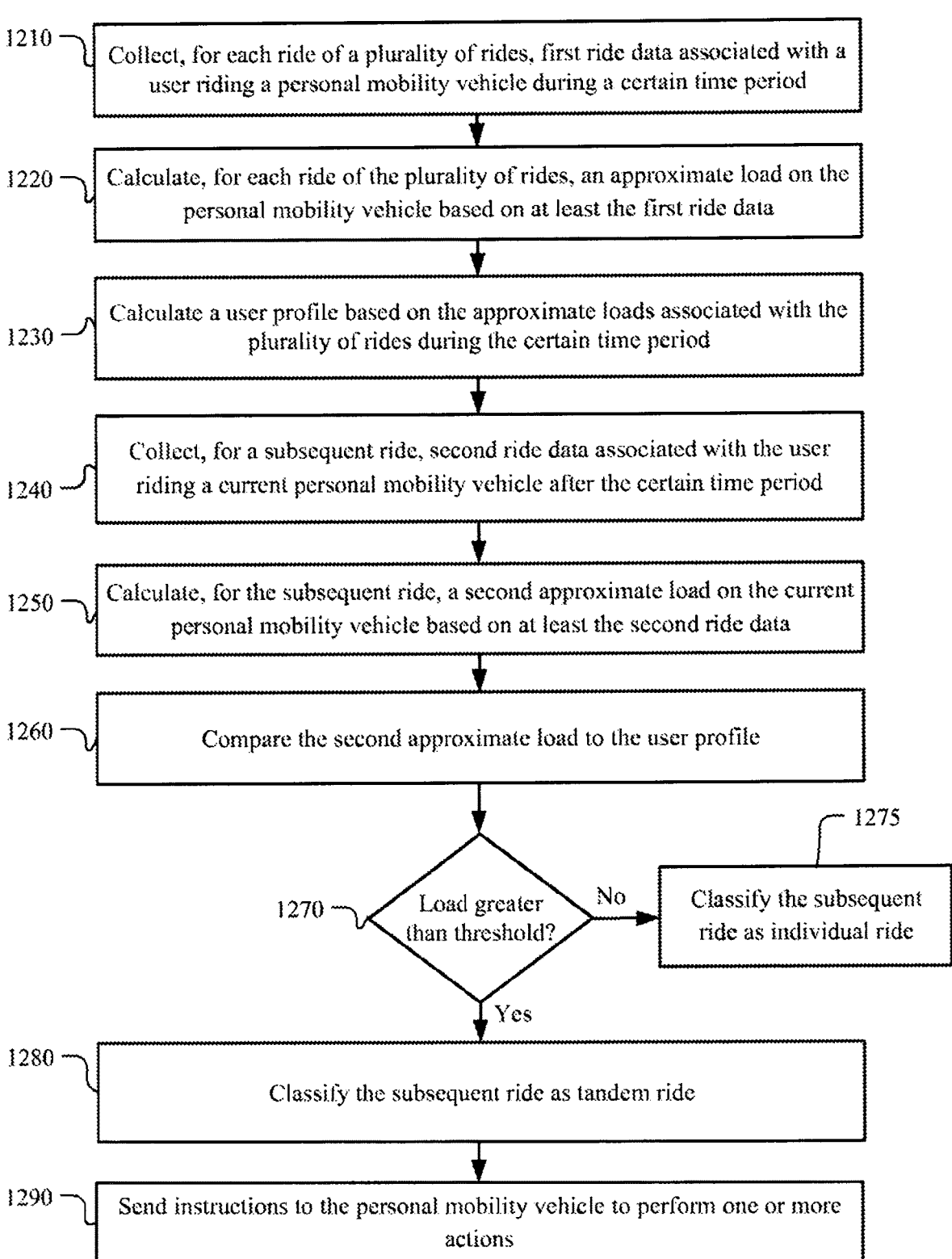

1200

1210 — Collect, for each ride of a plurality of rides, first ride data associated with a user riding a personal mobility vehicle during a certain time period 1220 — Calculate, for each ride of the plurality of rides, an approximate load on the personal mobility vehicle based on at least the first ride data 1230 — Calculate a user profile based on the approximate loads associated with the plurality of rides during the certain time period 1240 — Collect, for a subsequent ride, second ride data associated with the user riding a current personal mobility vehicle after the certain time period 1250 — Calculate, for the subsequent ride, a second approximate load on the current personal mobility vehicle based on at least the second ride data 1260 — Compare the second approximate load to the user profile 1270 — Load greater than threshold?

1275 — Classify the subsequent ride as individual ride    No

Yes

1280 — Classify the subsequent ride as tandem ride

1290 — Send instructions to the personal mobility vehicle to perform one or more actions

TANDEM RIDING DETECTION ON PERSONAL MOBILITY VEHICLES

BACKGROUND

Transportation services may provide transportation on demand, drawing from a transportation supply pool that includes vehicles of multiple types to meet the needs of those requesting transportation as such needs arise. Some transportation services may include personal mobility vehicles including, but not limited to, shareable or rentable bicycles and scooters in a dynamic transportation network in order to enable users to complete portions of a journey more efficiently. Such personal mobility vehicles, however, are not made for tandem riding (e.g., two riders riding on a scooter). For instance, a personal mobility vehicle (e.g., a scooter) may have limited hardware, low-powered, or light-weight components and tandem riding may lead to wear and tear of these components. Generally, in order to detect tandem riding, additional hardware or components may be needed on the personal mobility vehicles. For instance, a camera sensor, a weight sensor, and/or additional sensor(s) need to be installed for detecting tandem riding. However, with these additional components, the overall cost of the personal mobility vehicle increases and does not result in a cost-effective solution for tandem riding detection. As such, there is a need for a cost-effective technique for detecting tandem riding using the existing hardware or components of the personal mobility vehicle.

BRIEF DESCRIPTION OF THE DRAWINGS

FIG. 9A illustrates an example graph depicting changes in pitch when a personal mobility vehicle is in a dynamic setting (e.g., scooter moving on a path that involves some flattish ground portions and some up and down hills portion).

FIG. 9B illustrates an example pitch distribution graph reflecting pitch variations during a ride.

FIG. 12 illustrates an example method for classifying a ride on a personal mobility vehicle as an individual ride or a tandem ride, in accordance with particular embodiments.

DESCRIPTION OF EXAMPLE EMBODIMENTS

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described. In addition, the embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

Figure 1:
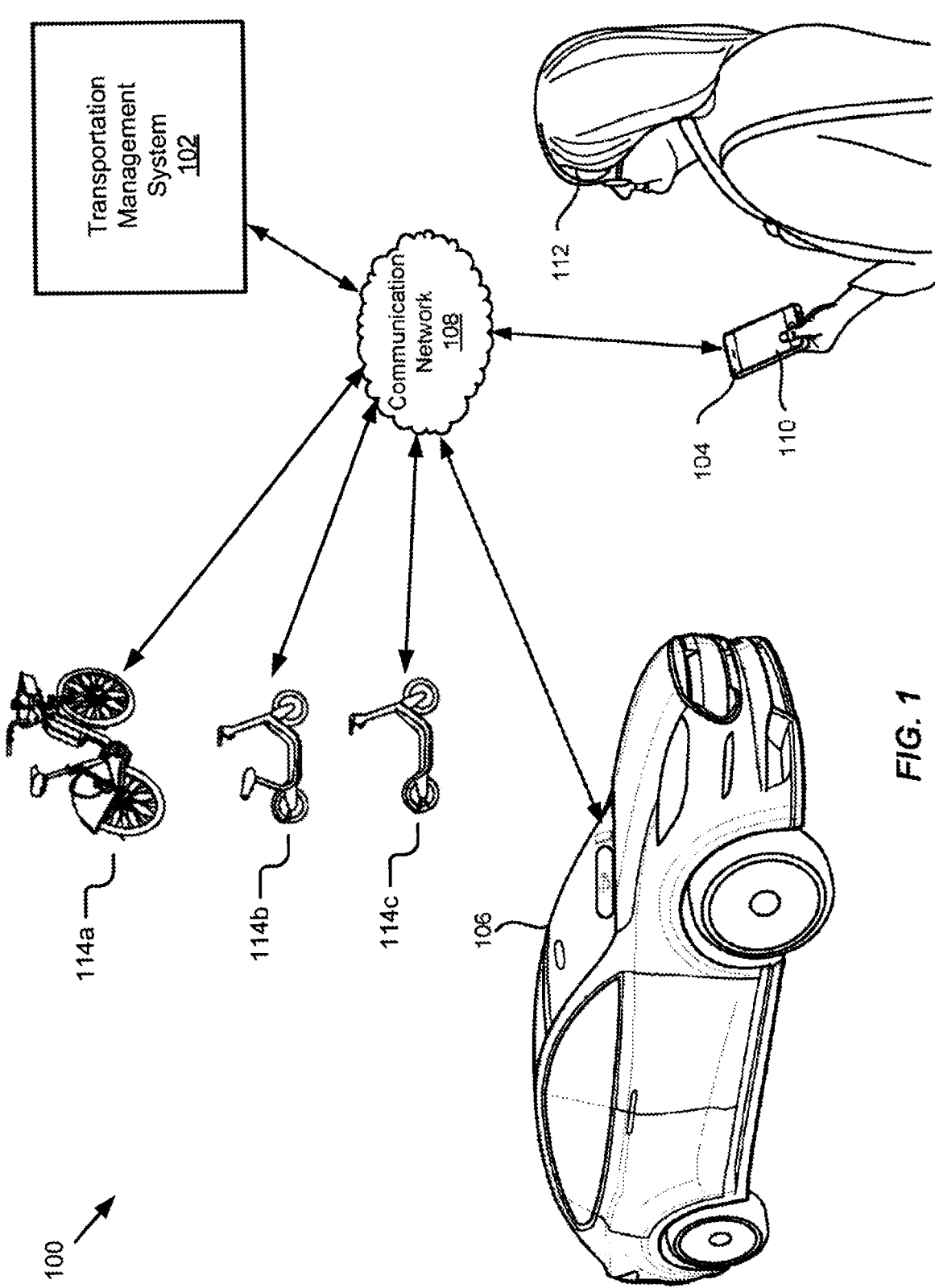
FIG. 1 illustrates an example environment associated with a transportation management system, in accordance with particular embodiments.

FIG. 1 illustrates an example environment 100 associated with a transportation management system 102, in accordance with particular embodiments. The transportation management system 102 may be configured to communicate, via a communication network 108, with a requestor computing device 104, a vehicle 106, and one or more personal mobility vehicles 114a, 114b, and 114c (individually and collectively herein referred to as 114). The personal mobility vehicles 114 discussed herein may be a light two-wheeled vehicle that may be used by a user (e.g., requestor 112) to ride short distances. By way of an example and without limitation, personal mobility vehicle 114a may be a bicycle, personal mobility vehicle 114b may be a motorized bike, and personal mobility vehicle 114c may be a scooter. An example personal mobility vehicle is further shown and discussed in detail in reference to FIG. 2.

A requestor 112 may use a ride matching requestor application 110 on a requestor computing device 104 to request a ride at a specified pick-up location. The request may include either the vehicle 106 or one of the personal mobility vehicles 114. For instance, if the requestor 112 wants to ride long distances, the requestor 112 may request the vehicle 106. The vehicle 106 may be a manual/human-driven vehicle or an autonomous vehicle. Specifically, the requestor 112, via the ride matching requestor application 110, may indicate need for the vehicle 106, a desired pickup location, and a drop-off location. The request for the vehicle 106 along with the requestor's pickup and drop-off locations may be sent to the transportation management system 102 via the communication network 108. Using the data received from the ride matching requestor application 110, the transportation management system 102 may identify available vehicles that are within a predetermined distance and/or expected pickup time away from the requestor 112. The transportation management system 102 may send the ride request to vehicle 106, which may then proceed upon a route to the pickup location provided by the requestor 112. The route may be determined by the transportation management system 102, the vehicle 106, or any combination thereof.

If on the other hand, the requestor 112 wants to ride short distances, the requestor 112 may request one of the personal mobility vehicles 114. For example, the requestor 112 may request the personal mobility vehicle 114c (e.g., a scooter) to ride to college, which may be 2 miles from the requestor's location. Specifically, requestor 112, via the ride matching requestor application 110, may indicate need for a particular type of personal mobility vehicle 114, time period for which the requestor 112 needs the particular type of personal mobility vehicle 114, a desired pick-up location from where the requestor 112 wants to pick up the personal mobility vehicle 114, and a drop-off location to where the requestor 112 may drop off the personal mobility vehicle 114. In particular embodiments, the ride matching requestor application 110 on the requestor's device 104 may show different types of personal mobility vehicles 114 (e.g., a bicycle, a motorized bike, a scooter, etc.), different docking stations where one or more of these personal mobility vehicles 114 are located or parked, and cost associated with each vehicle 114 based on the time period for which they are needed. The requestor 112, via the ride matching requestor application 110, may select a particular type of personal mobility vehicle 114 (e.g., a scooter) and a docking station from where the requestor 112 wants to pick up the vehicle 114. In some embodiments, the requestor 112 may choose to pick up the personal mobility vehicle 114 from one docking station but choose to drop-off the vehicle 114 at a different docking station. By way of an example and not by way of limitation, the requestor 112 needing a scooter to ride to college may choose to pick up the scooter from a docking station that is nearby to her home location and drop-off the scooter at a docking station that is nearby to the college.

The requestor's request for a particular type of personal mobility vehicle 114 along with desired docking station location(s) for pickup and drop-off, and the time period for which they need the vehicle 114 may be sent to the transportation management system 102 via the communication network 108. Using the data received from the ride matching requestor application 110, the transportation management system 102 may identify an available personal mobility vehicle 114 at the requestor's desired docking station and assign the vehicle 114 to the requestor 112 for the time period they requested. The transportation management system 102 may send indication of the assigned vehicle 114 and directions to the docking station where the assigned vehicle 114 is located to the ride matching requestor application 110. The requestor 112 may then use the directions to go to the docking station and take the assigned personal mobility vehicle 114 for their use. Additional environment and components associated with the transportation management system 102 are shown and discussed in reference to at least FIGS. 13 and 14.

Figure 2:
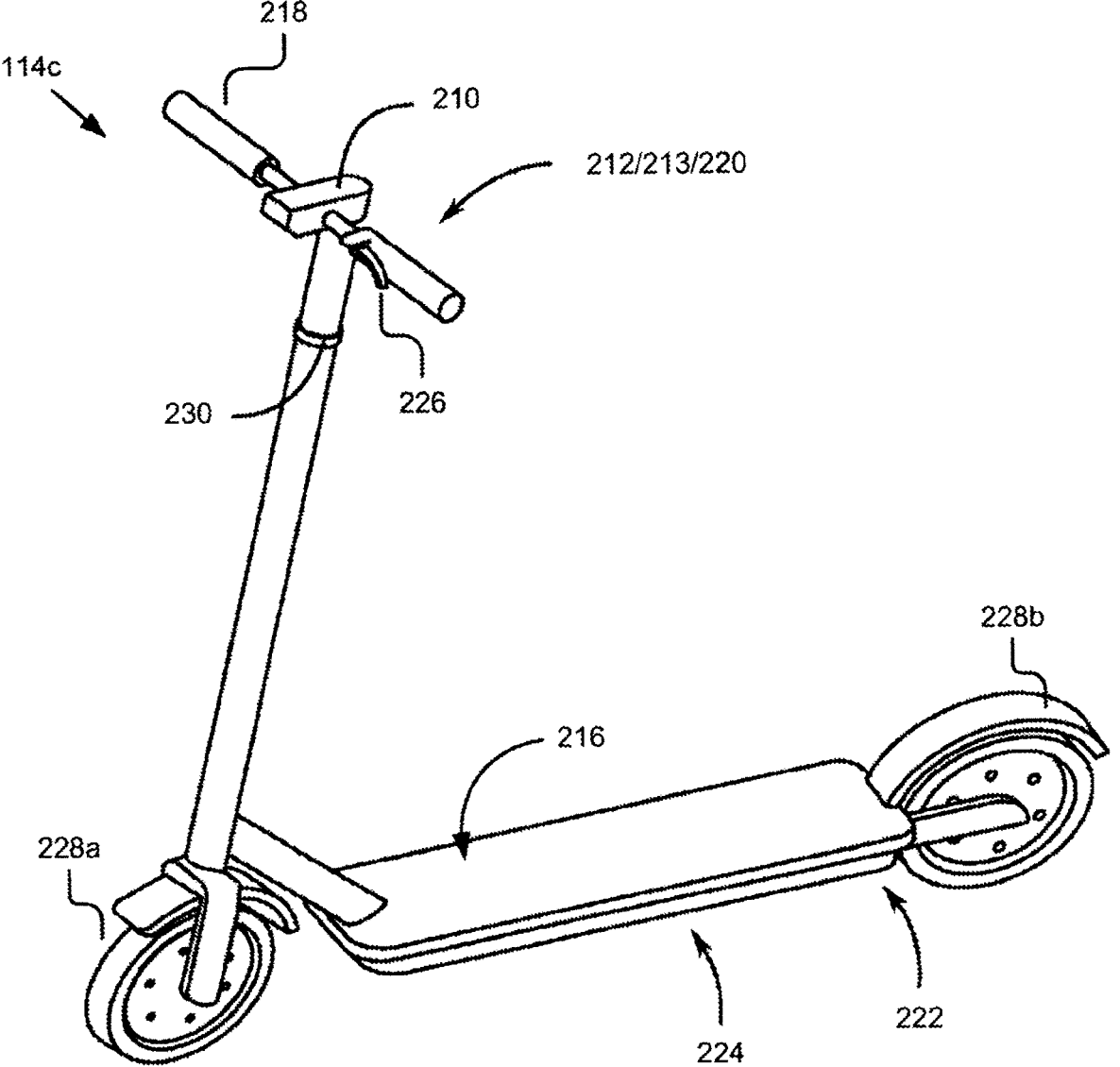
FIG. 2 illustrates an example personal mobility vehicle.

FIG. 2 illustrates an example personal mobility vehicle 114c. In particular, the personal mobility vehicle 114c is a motorized stand or kick scooter that may be configured to participate in the environment 100 associated with the transportation management system 102 of FIG. 1. For instance, a requestor 112, via their requestor application 110, may rent the personal mobility vehicle 114c to take rides for a certain time duration through the transportation management system 102, as discussed above in reference to FIG. 1. The personal mobility vehicle 114c may include a number of components. As shown, the personal mobility vehicle 114c may include controller/user interface/wireless communications module 212/213/220. The controller 212 may be configured to communicate between or to various components of the personal mobility vehicle 114c. In some embodiments, the controller 212 may be configured to perform one or more actions based on instructions received from the transportation management system 102. In some embodiments, the controller 102 may trigger one or more other components of the personal mobility vehicle 114c to perform the one or more actions. The user interface module 213 may be configured to present a display or graphical user interface with relevant information on a display screen 210 of the personal mobility vehicle 114c. The information on the display screen 210 may include ride information, such as, for example, current speed, mileage indicator, battery status indicator, distance traveled, time traveled, etc. In particular embodiments, the user interface module 213 may be configured to present one or more notifications related to tandem riding (e.g., two riders riding on the scooter) on the display screen 210 of the personal mobility vehicle. By way of an example and without limitation, if there are 2 riders riding on the personal mobility vehicle 114c, the transportation management system 102 may cause the personal mobility vehicle 114c to provide a notification to the user that tandem riding is not suitable for the personal mobility vehicle 114c. The wireless communications module 220 may be configured to send data to and/or receive data from an external system, such as the transportation management system 102. For example, the wireless communications module 220 may send data from one or more sensors (not shown) of the personal mobility vehicle 114c to the transportation management system 102 and may receive instructions related to tandem riding from the transportation management system 102, as discussed elsewhere herein.

In some embodiments, the personal mobility vehicle 114c may include a computer system (e.g., computer system 1500) to locally detect tandem riding or classify a ride as individual or tandem. The computer system may be configured to determine a user identity of a user riding the personal mobility vehicle 114c. Using the user identity and sensor data measured by one or more sensors (not shown) of the personal mobility vehicle 114c, the computer system may retrieve a user profile of the user from the transportation management system 102. The user profile may include, for example, a list of ride IDs (e.g., unique identifiers that may be used to identify rides associated with a user). These rides may have telemetrics associated with them to be used to calculate load. The user profile may further include, for example and without limitation, a list of telemetrics that may be directly representative of previous rides loads, a list of loads, a threshold calculated by the transportation management system 102 based on previous rides or ride data associated with the user, etc. For classifying a particular ride as individual or tandem, the computer system may calculate a current load on the personal mobility vehicle 114*c* based on at least sensor data measured by sensor(s) of the personal mobility vehicle 114*c*, compare the current load to the user profile retrieved from the transportation management system 102, and classify the particular ride as individual ride or tandem ride based on the comparison.

The personal mobility vehicle 114*c* may further include a base/deck/board 216 on which a user riding the personal mobility vehicle 114 may stand, a handlebar 218 to steer the personal mobility vehicle 114*c*, and a brake 226 to apply brakes. The user may adjust the height of the personal mobility vehicle 114*c* according to their height by adjusting a stem 230 of the personal mobility vehicle 114*c*. For instance, the user may increase the height of the vehicle 114*c* by pulling up the stem or extending the stem 230 upwards. Conversely, the user may decrease the height of the vehicle 114*c* by pushing the stem 230 downwards. The personal mobility vehicle 114*c* may further include a propulsion system 222 configured to provide motive power to at least one of the wheels (e.g., a front wheel 228*a* and/or rear wheel 228*b*) of the personal mobility vehicle 114*c*, battery 224 for powering propulsion system 222 and/or other elements of the personal mobility vehicle 114*c*, and docking mechanism (e.g., not shown) for docking the personal mobility vehicle 114*c* at a docking station.

In particular embodiments, the personal mobility vehicle 114*c* may include one or more sensors (not shown). Some of the sensors in the personal mobility vehicle 114*c* may include, for example and without limitation, a GPS sensor, a motor current sensor, a speed sensor, an accelerometer, a gyroscope, an orientation sensor, a throttle position sensor, etc. These sensors may be capable of providing their respective measurements as sensor signals and/or data to various devices of the environment 100, including the transportation management system 102. The GPS sensor may be configured to determine absolute and/or relative positions of the personal mobility vehicle 114*c* (e.g., or an element of vehicle 114*c*). The positions may be determined based on wireless signals received from space-born and/or terrestrial sources (e.g., eLoran, and/or other at least partially terrestrial systems), for example. In some embodiments, the GPS sensor may include an altimeter, for example, or may be used to provide an absolute altitude.

The motor current sensor in the personal mobility vehicle 114*c* may be configured to measure motor current flowing through the motor of the personal mobility vehicle 114*c*. Specifically, the motor current sensor may determine different motor currents that are being generated or produced by the motor of the personal mobility vehicle 114*c* at different speeds. The wheel torque or vehicle torque can be calculated from a motor design constant kT (A/Nm) and motor current. In some embodiments, the motor current sensor may determine a higher motor current at a particular speed when there is more load on the personal mobility vehicle 114*c* in contrast to when there is less load on the vehicle 114*c* at the same speed. The speed sensor may be configured to measure the speed of the personal mobility vehicle 114*c*. In some instances, acceleration may be derived from speed differential. The accelerometer may be configured to measure angular velocities/accelerations and/or linear accelerations (e.g., direction and magnitude) of the personal mobility vehicle 114*c*. The orientation sensor may be implemented as one or more of a compass, float, accelerometer, and/or other device capable of measuring an orientation of the personal mobility vehicle 114*c* (e.g., magnitude and direction of roll, pitch, and/or yaw, relative to one or more reference orientations such as gravity and/or Magnetic North). In some embodiments, the one or more sensors of the personal mobility vehicle 114*c* can be used to determine a rider's intent. For example, determining the rider's intent may include determining whether the user is trying to accelerate (e.g., change in throttle position). If that is the case, then this data may be used for load estimation. As another example, determining the rider's intent may include determining whether the user is coasting. If that is the case, then this data may be used for filtering. Yet as another example, determining the user's intent may include determining whether the user/rider is maintaining speed. If that is the case, then this data may be used for the motor current speed bins methodology, as discussed in further below in reference to at least FIGS. 10A-10B.

Figure 3A:
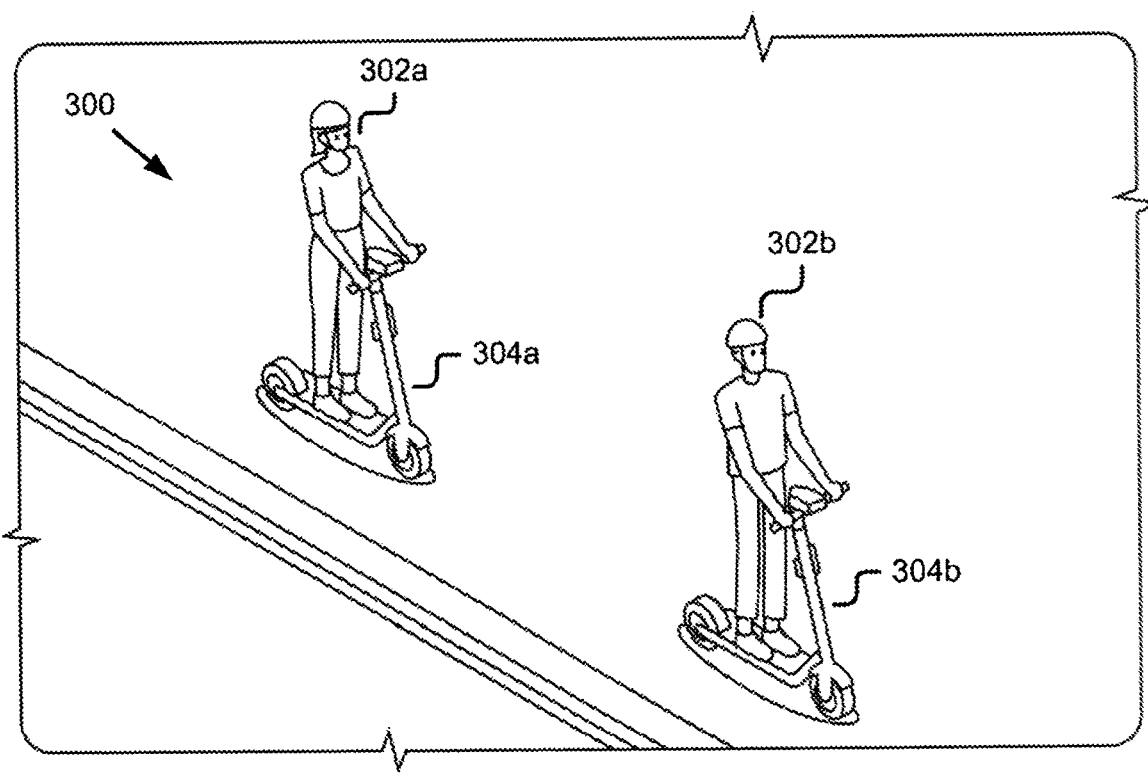
FIG. 3A illustrates an example scenario of an individual riding on a personal mobility vehicle.
Figure 3B:
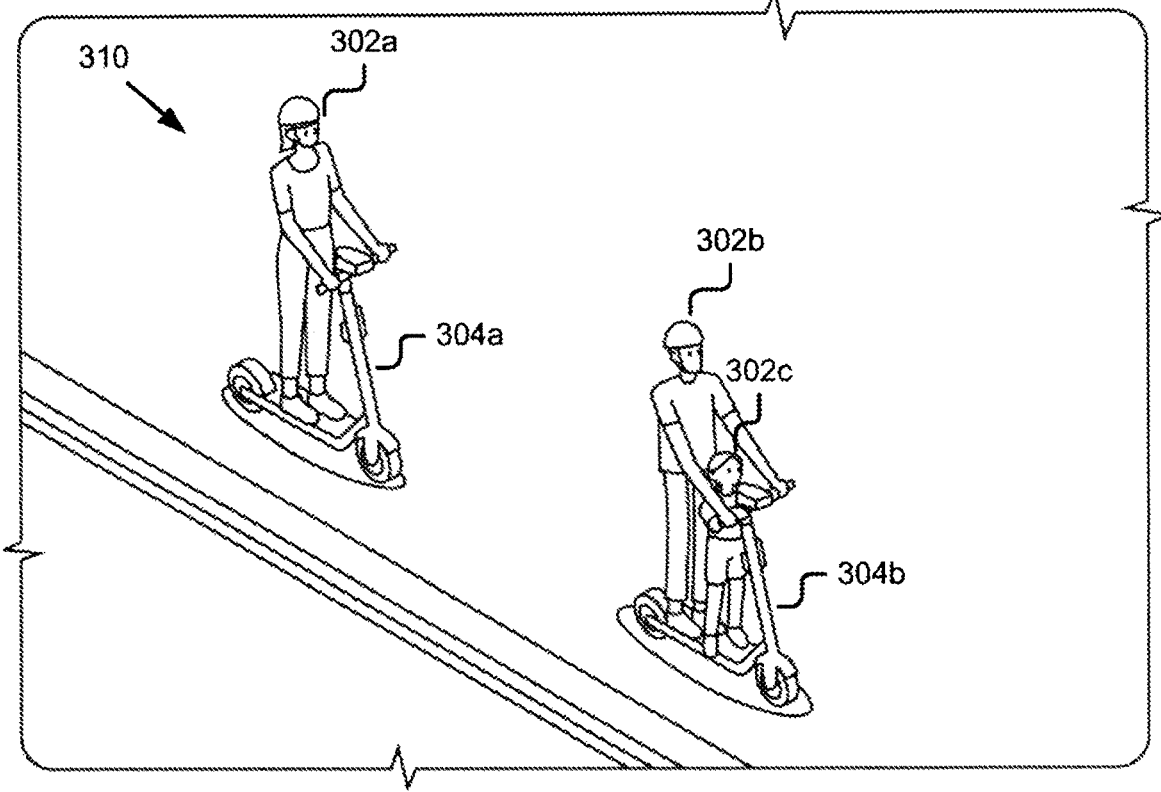
FIG. 3B illustrates an example scenario of tandem riding on a personal mobility vehicle.
Figure 4:
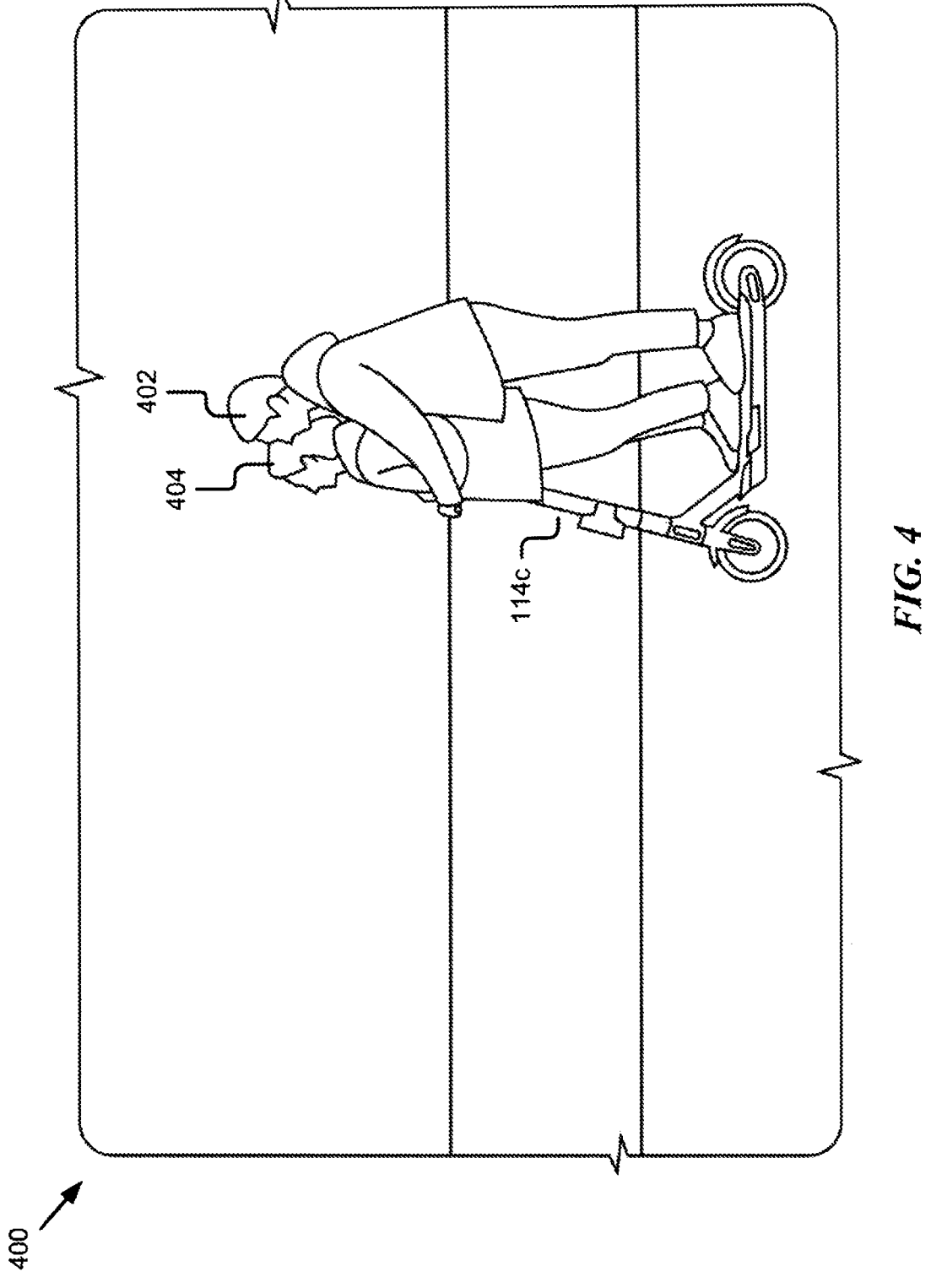
FIG. 4 illustrates another example scenario of tandem riding on a personal mobility vehicle.

A personal mobility vehicle, such as the personal mobility vehicle 114*c*, may be used by a user or an individual to go from one place to another. FIG. 3A illustrates an example scenario 300 of an individual riding on a personal mobility vehicle (e.g., scooter). Specifically, FIG. 3A illustrates two example riders 302*a* and 302*b* riding personal mobility vehicles 304*a* and 304*b* individually. That is, only one rider is present on the scooter 304*a* or 304*b*. In some instances, there may be two individuals riding on the same scooter (i.e., tandem riding). FIG. 3B illustrates an example scenario 310 of tandem riding on a personal mobility vehicle, such as the personal mobility vehicle 114*c*. Specifically in the scenario 310, the rider 302*a* is still individually riding the personal mobility vehicle 304*a*. However, the rider 302*b* adds another rider 302*c* on the personal mobility vehicle 304*b*, which causes a tandem riding situation. FIG. 4 illustrates another example scenario 400 of tandem riding, where two riders 402 and 404 are riding on the personal mobility vehicle 114*c*.

In particular embodiments, tandem riding (e.g., two riders riding) on a personal mobility vehicle, such as the personal mobility vehicle 114*c* of FIG. 2, may not be suitable. As an example and not by way of limitation, tandem riding may not be suitable according to the city regulations or policies in a city/place where a user is currently riding the personal mobility vehicle (e.g., scooter). In particular, the city may have imposed guidelines that tandem riding is not allowed at certain areas or locations, and if the user is found tandem riding, then they may be fined or issued a ticket.

By way of another example and not by way of limitation, tandem riding on the personal mobility vehicle may cause wear and tear of components of the personal mobility vehicle. For instance, the personal mobility vehicle may be made to carry up to 220 pounds of rider weight and if there is excess weight (e.g., more than 220 pounds) present on the personal mobility vehicle, then one or more components start getting affected or degraded. In particular, if there are two riders, such as riders 302*b* and 302*c* as shown in scenario 310, whose weights equal to 330 pounds are riding on the personal mobility vehicle 304*b* that is capable of carrying only up to 220 pounds, the personal mobility vehicle may produce more current in order to be moved. The increased current will put a tremendous load on the vehicle's engine due to which the engine may degrade over time. Also, due to this increased current and/or engine load, there may also be an impact on the battery performance. For instance, the battery may discharge more quickly and needs to be recharged more frequently. The frequent charge and discharge of the battery may lead to battery failure or degradation.

By way of yet another example and not by way of limitation, tandem riding may be perceived negatively by some people. For instance, some people might consider tandem riding as dangerous or at least there may be some public perception that it is dangerous to the users. Considering the scenario 310 of FIG. 3B where the rider 302*b* is riding with his child 302*c*, some people may think that such tandem riding is dangerous to the child 302*c* and may hurt him.

Therefore, tandem riding needs to be detected and the rider warned, for example rider 302*b* or 402. In some embodiments, in order to detect tandem riding, additional hardware or components may be needed on the personal mobility vehicle 114*c*. For instance, a camera sensor, a weight sensor, and/or one or more additional sensors need to be installed for detecting tandem riding. However, with these additional components, the overall cost of the personal mobility vehicle 114*c* (e.g., scooter) increases and does not result in a cost-effective solution for tandem riding detection. As such, there is a need for a cost-effective technique for detecting tandem riding using the existing hardware or components of the personal mobility vehicle 114*c*.

Figure 5:
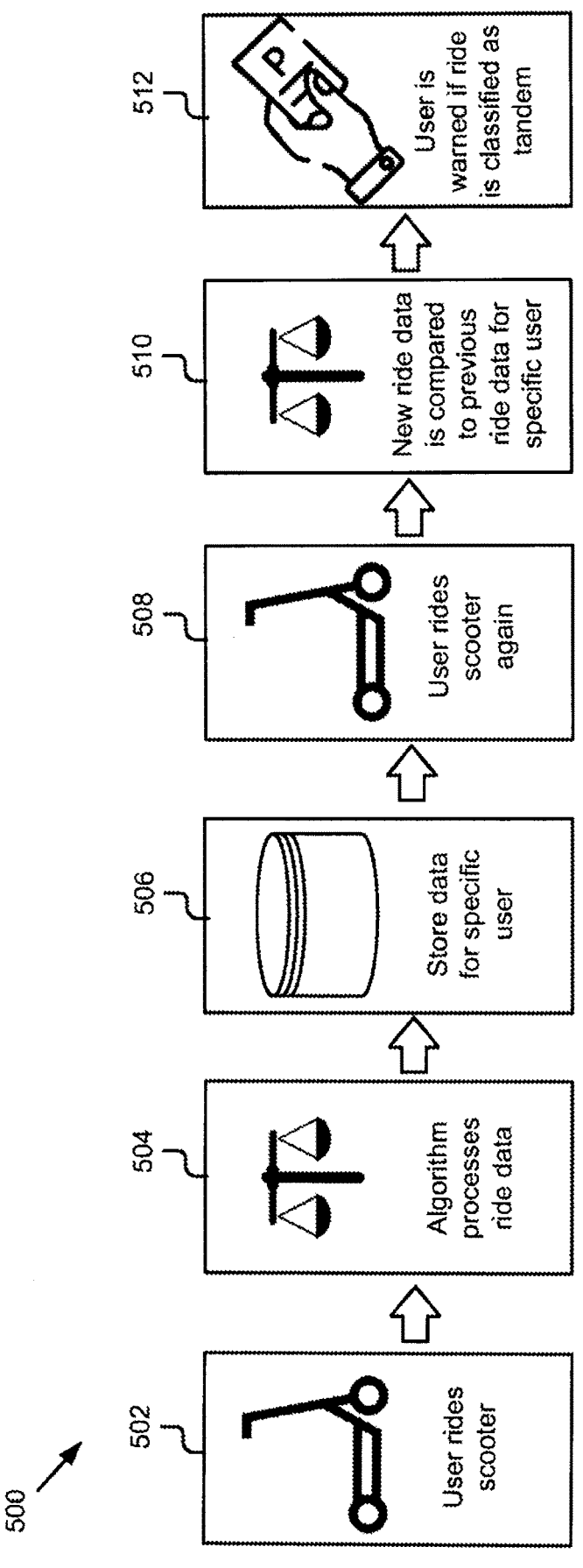
FIG. 5 illustrates a high-level workflow or method for detecting tandem riding, in accordance with particular embodiments.

FIG. 5 illustrates a high-level workflow or method 500 for detecting tandem riding, in accordance with particular embodiments. As depicted, the method 500 begins, at step 502, with a user riding a personal mobility vehicle, such as a scooter. For instance, as discussed above in reference to FIG. 1, the requestor 112 may request for the personal mobility vehicle 114*c* (e.g., scooter) via their requestor application 110. The request is sent to the transportation management system 102, which assigns the personal mobility vehicle 114*c* to the requestor 112 for the desired time that the requestor 112 requested for. As the requestor 112 is riding the personal mobility vehicle 114*c*, one or more sensors on the vehicle 114*c* may obtain ride data. For example, the motor current sensor may obtain motor currents at various speeds, the speed sensor may obtain the current speed of the vehicle, the GPS sensor may obtain the position and/or location of the vehicle 114*c*, etc. Data from the various sensors on the personal mobility vehicle 114*c* may be sent to the transportation management system 102.

At step 504, a tandem riding detection algorithm (e.g., tandem riding detection algorithm 1302) running on the transportation management system 102 may process ride data received from the personal mobility vehicle. Specifically, the algorithm may process the data from the various sensors of the personal mobility vehicle and estimate an approximate load (e.g., mass) of the rider (e.g., rider 302*a*, 302*b*, or rider 402), as discussed in further detail below with respect to FIG. 6A-6B. It should be noted that the algorithm does not need to be very accurate or precise in estimating the load/mass of the rider and a rough estimation of the current load and delta from expected rider's load from previous rides is needed to detect tandem riding discussed herein.

At step 506, the transportation management system 102 may generate a user profile for the user or rider by storing data for the user in a database, such as database 624 or 1414. Specifically, upon estimating the approximate load of the user riding the personal mobility vehicle 114*c*, the transportation management system 102 may store the approximate load value and associate that with the specific user for later access and/or retrieval. In particular embodiments, the transportation management system 102 may estimate and store approximate load values of the rider (e.g., rider 302*a*, 302*b*, or rider 402) for a certain number of rides/times before the algorithm may detect tandem riding. By way of an example and without limitation, the tandem riding detection algorithm on the transportation management system 102 may estimate approximate loads of the rider for at least 3 rides before it can make a determination on whether a ride is an individual ride or a tandem ride. Continuing this example, steps 502-506 may be repeated for three times before the algorithm can detect tandem riding for a future/subsequent user ride (e.g., fourth ride). In particular embodiments, the transportation management system 102 may compute a threshold based on the estimated loads it has estimated for the user based on rides so far. The threshold may be used to classify a subsequent/future ride as a tandem ride or an individual ride, as discussed in further detail below.

At step 508, the user rides the personal mobility vehicle 114*c* (e.g., scooter) again at a future time instance. For example, the user (e.g., rider 302*b* or rider 402) rides the personal mobility vehicle 114*c* after a month. The personal mobility vehicle 114*c* may send new ride data (e.g., sensor data associated with subsequent/current ride) to the transportation management system 102. In particular, the personal mobility vehicle 114*c* may send, via the wireless communications module 220, sensor data from one or more sensors of the vehicle 114*c* to the transportation management system 102. Based on the sensor data received from the personal mobility vehicle 114*c* for the new or subsequent ride, the tandem riding detection algorithm may again estimate a current load of the user in the new ride.

At step 510, the tandem riding detection algorithm may compare new ride data to previous ride data or the user profile associated with the specific user or rider. Specifically, the algorithm may compare the current load of the rider associated with the new ride (e.g., ride after a month) with previous loads of the rider associated with previous rides. By way of an example, during the past month, the user may have ridden the vehicle 114*c* for 3 times. Based on these 3 previous user rides, the tandem riding detection algorithm may have estimated approximate loads of the user as 45 kg, 50 kg, and 60 kg, respectively. The algorithm may have also computed a threshold of 59.6 kg based on these three estimated load values. At step 510, the algorithm may compare the user's current approximate load (e.g., current rider's mass) with the threshold (e.g., 59.6 kg). Based on this comparison, the algorithm may make a determination of whether the new ride is an individual ride (e.g., a single rider present on scooter as shown for example in scenario 300 of FIG. 3A) or a tandem ride (e.g., two riders present on scooter as shown for example in scenario 310 of FIG. 3B or in FIG. 4). More specifically, if the user's current approximate load in the new ride is greater than the threshold, the algorithm may classify the ride as tandem. Otherwise, the algorithm may classify the ride as the individual ride.

At step 512, the user riding the personal mobility vehicle 114*c* (e.g., scooter) may be warned if the ride is classified as tandem. For instance, if the tandem riding detection algorithm detects tandem riding, the personal mobility vehicle 114*c* may receive instructions from the transportation management system 102 to present one or more notifications to the user. The personal mobility vehicle 114*c* may receive the instructions from the transportation management system 102 via the wireless communications module 220. Upon receiving the instructions, the controller 212 may perform one or more actions with respect to tandem riding. As an example, the controller 212 may apply brakes (e.g., brakes 226) on the personal mobility vehicle 114*c* to jam or restrict movement of the vehicle 114*c*. As another example, the controller 212 may trigger an alarm or a sound alert to warn the riding users of tandem riding, as shown for example in FIG. 11D. As yet another example, the controller 212 may trigger the user interface module 213 to present one or more visual notifications to the riding users. For instance, the user interface module 213 may present a visual notification on the display screen 210 of the personal mobility vehicle 114c. For example, the notification may be that the scooter is unfit for tandem riding. As another example, the notification may be that tandem riding is detected. Yet as another example, the notification may be that the user may be fined for tandem riding.

Figure 6A:
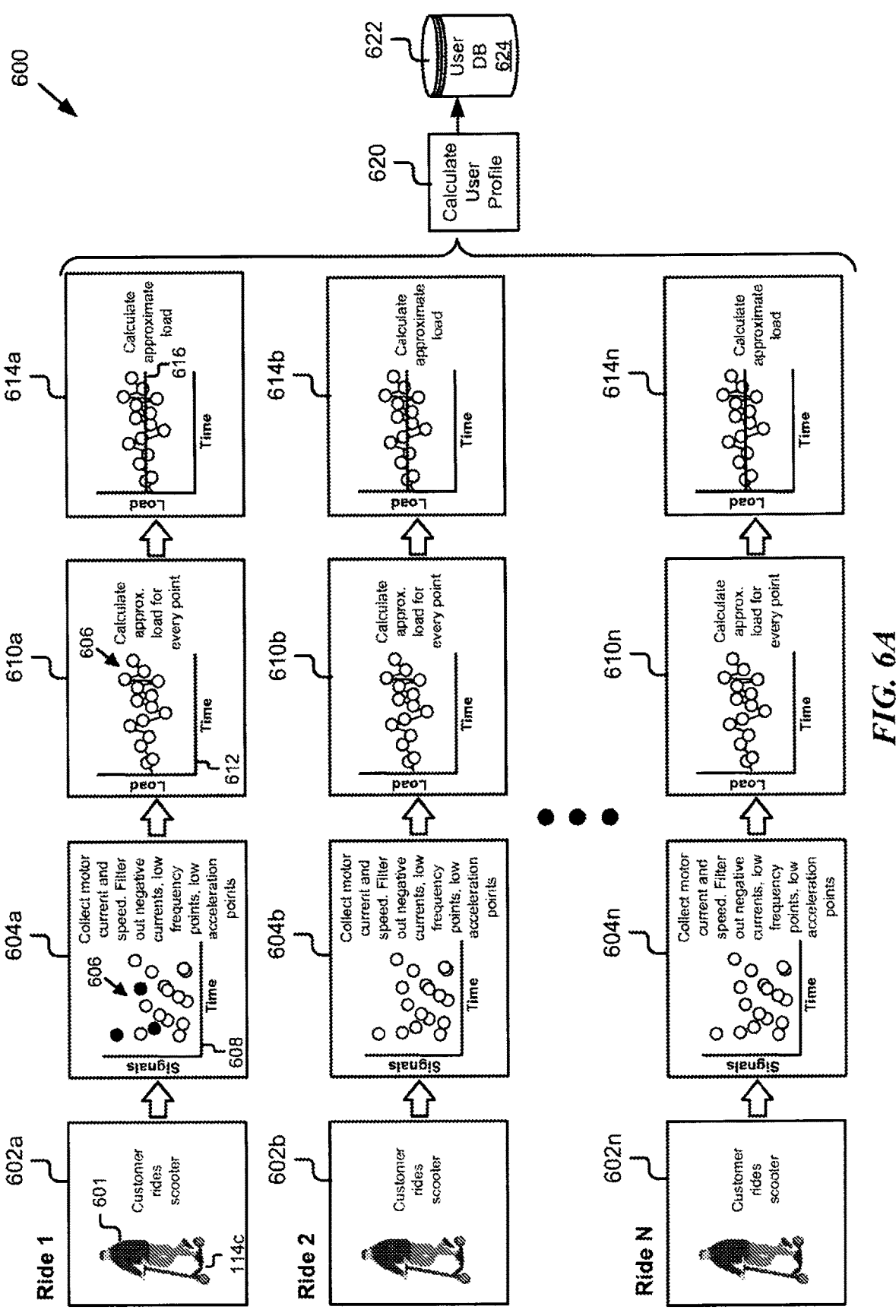
FIG. 6A-6B illustrates an example load estimation methodology for detecting tandem riding, in accordance with particular embodiments.
Figure 6B:
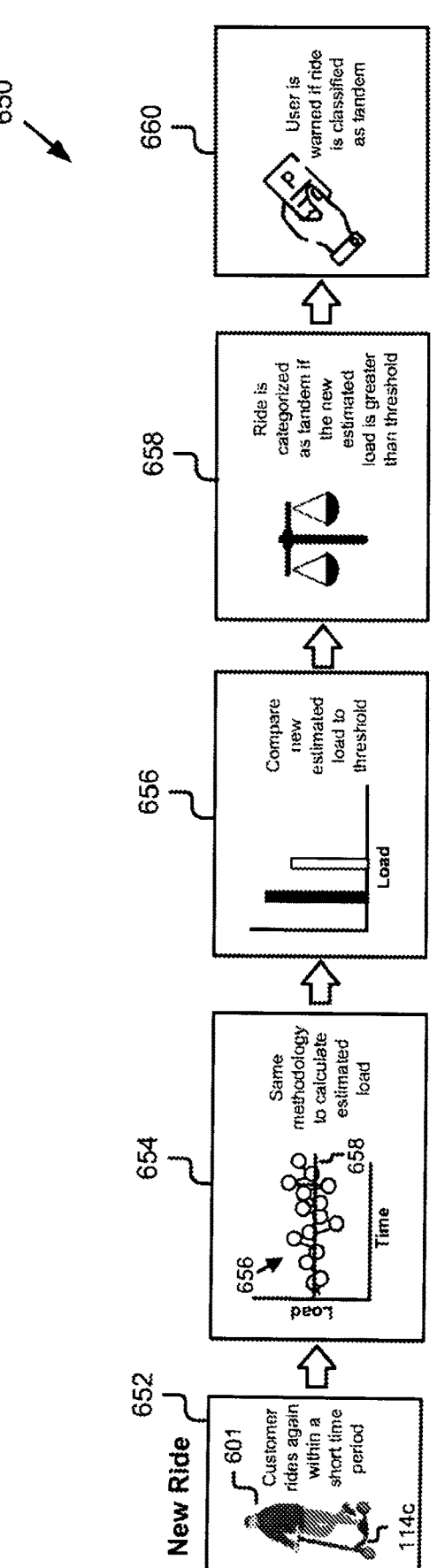

FIG. 6A-6B illustrates an example load estimation methodology for detecting tandem riding, in accordance with particular embodiments. Specifically, FIG. 6A illustrates an example process or method 600 for collecting ride data of a user 601 for a certain time period and calculating a user profile (e.g., threshold) for ride classification. FIG. 6B illustrates an example method 650 for classifying a future user ride as tandem or not tandem based on the user profile calculated in FIG. 6A. It should be noted that the personal mobility vehicle 114c discussed herein may be interchangeably referred to herein as a scooter.

Referring to FIG. 6A, ride data (e.g., sensor data) for a plurality of rides, including ride 1, ride 2, . . . , ride N may be collected over a certain time period. By way of an example and without limitation, the transportation management system 102 may collect ride data of the user 601 riding the scooter 114c for a week, couple of weeks, a month, a quarter, etc. By way of a more specific example, the user 601 may have taken three rides on the scooter 114c in a week, and the transportation management system 102 may collect ride data and estimate an approximate load of the user 601 for each of the three rides. In some embodiments, ride data of the user 601 over a certain time period (e.g., a week, a month) may be needed in order for the tandem riding detection algorithm to do its tandem riding classification. Specific method for collecting the ride data and estimating the approximate load is now discussed in detail below with respect to one example ride, such as Ride 1.

The method 600 begins, at step 602a, where the user 601 takes their first ride on the scooter 114c. As the user 601 is riding the scooter, one or more sensors on the scooter 114c may measure their respective sensor data. For example, a motor current sensor may measure motor current and a speed sensor may measure the speed of the scooter at various points (e.g., points 606) throughout the ride. Sensors may take their measurements at periodic time intervals, such as, for example, at every couple of seconds, at every minute, every couple of minutes, etc.

Figure 7:
FIG. 7 illustrates an example chart illustrating impact of acceleration error due to sample rate of speed.

At step 604a, the transportation management system may collect ride data from the various sensors of the scooter 114c. For instance, the sensors of the scooter 114c may be configured to send their data to the transportation management system 102 via the wireless communications module 220. In some embodiments, signals may be collected within a certain time period (e.g., at the same time as ride data from sensors is collected or within a short duration) to reduce errors. As shown, the system 102 may collect motor current and speed from the motor current sensor and speed sensor, respectively, for various points 606 (individually and/or collectively referred to as 606) throughout Ride 1. An example chart 608 illustrates motor current and speed signals accumulated over time. In some embodiments, the system 102 may filter out some of the accumulated data points 606 (e.g., sensor data). For instance, the system 102 may filter out points during the ride with negative currents, low frequencies, low accelerations, etc. These points, if not filtered, may lead to error in load estimation. By way of an example, FIG. 7 illustrates an example chart 700 illustrating impact of acceleration error due to sample rate of speed. Here, X-axis represents the acceleration, Y-axis represents the different sample frequencies, and the curved lines 702 represent the percentage error on load. As can be noted by curved line 702a, there is a significantly high error on load at low frequency and/or low acceleration. As such, such low frequency points and/or low acceleration points need to be filtered out before estimating the load.

Once the filtering is done, at step 610a, the tandem riding detection algorithm (tandem riding detection algorithm 1320) may calculate an approximate load (e.g., mass) for every point 606 remaining after the filtering. As an example, if there were 20 points that were accumulated over a 5-minute ride and 15 of these points are remaining after the filtering, then the algorithm may estimate a load value for each of these 15 points. An example load-time chart 612 illustrates approximate load calculated over time for the plurality of points 606. In particular embodiments, the algorithm may estimate a load value (e.g., mass) for a point based on following equation:

$$L = \frac{F - 1/2 \times Cd \times FA \times \rho \times \mathrm{sign}(v + \mathrm{wind}) \times (v + \mathrm{wind})2}{a + \mu \times g \times \cos(\theta) + g \times \sin(\theta)} \quad (1)$$

Here, $C_d$ is coefficient of drag, $F_A$ is frontal area, and p is air density. In some embodiments, $C_d$, $F_A$, and $\rho$ may be constants (e.g., fixed values) and may be tuned from test data. Speed may be reported from the speed sensor of the personal mobility vehicle 114c. Velocity v is the rate of change of displacement (e.g., change of distance in a particular direction with respect to time). Acceleration a is rate of change of velocity per unit of time i.e., $a=\Delta v/\Delta t$ (e.g., amount of increase or decrease in velocity over time). g is acceleration due to gravity on Earth and the value of g is 9.8 $m/s^2$. $\theta=a$ tan(grade/100), where grade may be estimated from an accelerometer or gyroscope sensor of the personal mobility vehicle 114c. In particular embodiments, grade may be estimated from a pre-generated or predefined elevation map, as discussed in further detail below. Force=$I*K_T/R$, where I is motor current reported from the motor controller or motor current sensor of the personal mobility vehicle 114c, $K_T$ is motor torque constant, and R is wheel radius.

In particular embodiments, the above may give an approximate total load on the personal mobility vehicle, such as the scooter 114c. To estimate load of the rider (e.g., user 601), the tandem riding detection algorithm may subtract the scooter's weight from the total load it has calculated. For example, the scooter weight may be a fixed weight, such as 19 kg. The algorithm may have calculated an approximate total load L as 79 kg using the above equation. The algorithm may subtract the scooter weight 19 kg from the total load 79 kg to estimate an approximate load (e.g., mass) of the rider as 60 kg.

In some embodiments, Force F may be calculated as follows:

$$F = ma + \text{Aero Force} + \text{Rolling Resistance Force} + \text{Grade Force}$$

Where Aero Force=$\frac{1}{2} \times C_d \times F_A \times \rho \times \mathrm{sign}(v+\mathrm{wind}) \times (v+\mathrm{wind})^2$. Here, $C_d$ is coefficient of drag, $F_A$ is frontal area, $\rho$ is air density, v is velocity, headwind is positive and tailwind is negative.

Rolling Resistance Force=$\mu \times m \times g \times \cos(\theta)$. Here, $\mu$ is rolling resistance coefficient, m is mass, g is acceleration due to gravity, and $\theta$=a tan(grade/100).

Grade Force=$m \times g \times \sin(\theta)$. Here, m is mass, g is acceleration due to gravity, and $\theta$=a tan(grade/100).

Figures 8A, 8B, 8C, 8D:
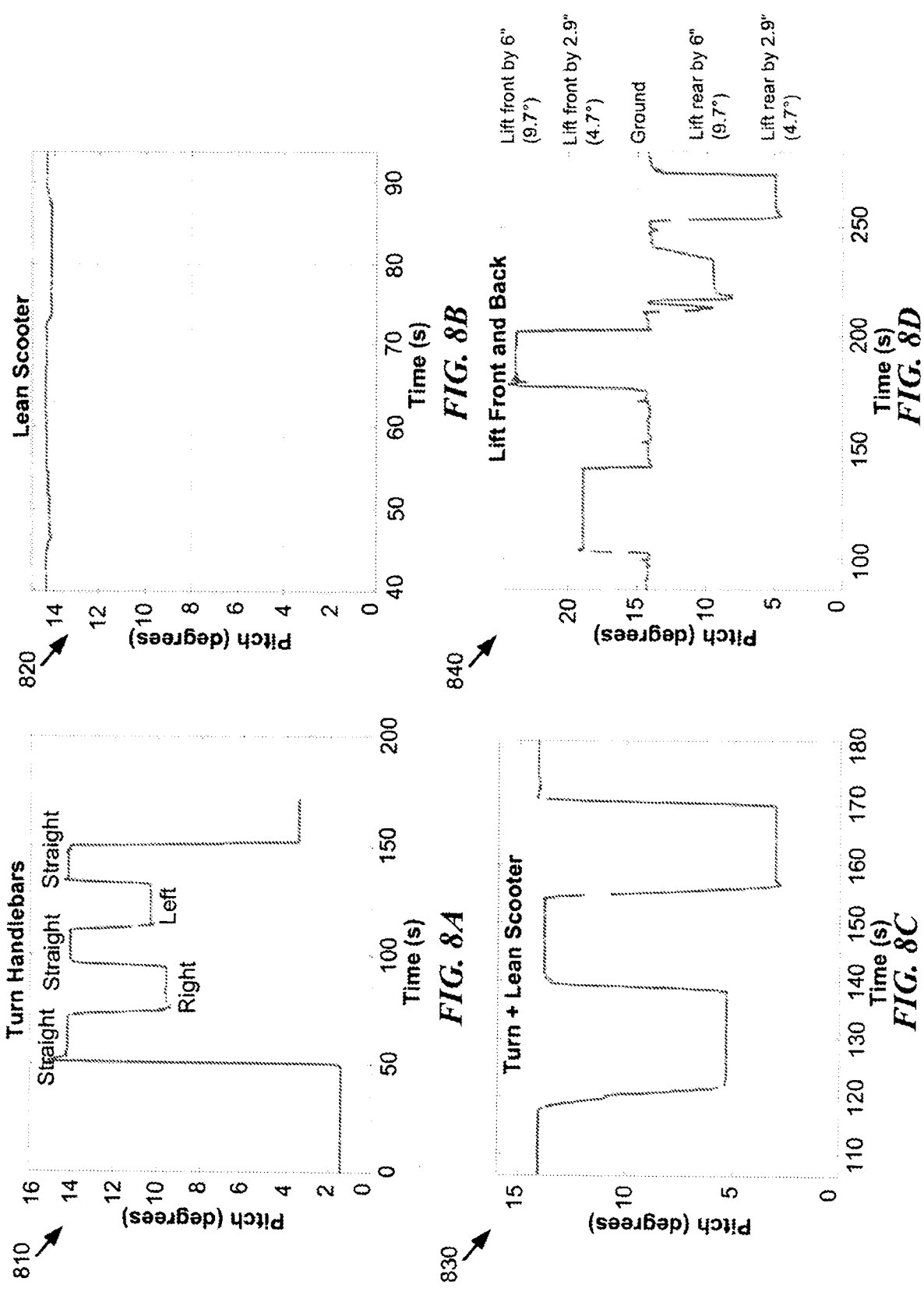
FIGS. 8A-8D illustrates example graphs depicting changes in pitch at different scenarios when a personal mobility vehicle is in a stationary setting (e.g., scooter is stationary or not moving).

In some embodiments, grade may be estimated from the accelerometer or gyroscope sensor of the scooter 114c. However, the sensor may inaccurately estimate pitch when turning and leaning. The sensor is mounted to the frame at a non-zero angle, e.g. 13°. This results in changes in pitch when the scooter 114c turns and leans. In some embodiments, max grade that the scooter experiences is likely 10%, which is equivalent to 5.7° pitch, which the sensor reads from just turning and leaning. For example, FIGS. 8A-8D illustrates example graphs depicting changes in pitch at different scenarios when the scooter 114c is in a stationary setting (e.g., scooter 114c is stationary or not moving). Specifically, FIG. 8A illustrates an example graph 810 reflecting changes in pitch detected by the scooter's sensor when turning the handlebars (e.g., handlebar 218). As depicted, turning the handlebars changes pitch reading by 4-4.5°. FIG. 8B illustrates an example graph 820 reflecting changes in pitch detected by the scooter's sensor when leaning the scooter (e.g., shifting body weight towards a particular direction to gently curve the scooter in that direction). As depicted, leaning the scooter while keeping the handlebars straight did not change pitch reading significantly. FIG. 8C illustrates an example graph 830 reflecting changes in pitch detected by the scooter's sensor when turning the handlebars as well as leaning the scooter. As depicted, turning and learning the scooter changes pitch reading by 9-11°. FIG. 8D illustrates an example graph 840 reflecting changes in pitch detected by the scooter's sensor when lifting the scooter 114c front and back. It has been observed that stationary pitch measurements with handlebars straight are correct within <1°.

Even in dynamic settings (e.g., scooter 114c moving), sensor measurements may become highly unreasonable for large portions of the ride. The gyroscope sensors are often dependent on the stability of the surrounding magnetic field, which changes due to electronics everywhere. Further, error in pitch can be amplified due to motion and vibration.

For instance, FIG. 9A illustrates an example graph 900 depicting changes in pitch when the scooter 114c is moving on a path that involves some flattish ground portions 902a and 902b and some up and down hills portion 904. The first flat ground portion 902a of the ride is reasonable with pitch variation due to turning and leaning. The hill portion 904 is also reasonable (e.g., within a few % of grade). However, the last flat ground portion 902b is unreasonable. That is, there are significant pitch variations or changes in pitches in the last flat ground portion 902b. FIG. 9B illustrates an example pitch distribution graph 950 reflecting pitch variations during a ride. As depicted, approximately 30% of the ride's pitch output are at values beyond error due to turning and leaning (e.g., greater than 5° pitch).

Therefore, the transportation management system 102 cannot use or rely on the scooter's sensor for grade estimation. Pitch measurements in-ride are unreliable, as discussed above with respect to FIGS. 8A-8D and FIGS. 9A-9B. The sensor may read high pitch values when the scooter 114c is not on hills. As such, an alternate way of grade estimation is needed. In particular embodiments, the transportation management system 102 may use the onboard GPS and a predefined elevation map (also interchangeably referred to as a grade map) in place of sensor-based grade estimation. Stated differently, since grade may be a large contributor to error and the sensor cannot reliably estimate pitch, the system 102 may use a predefined elevation map. The map may be generated from a particular elevation application programming interface (API) (e.g., Google Elevation API).

In particular embodiments, the system 102 may estimate a grade value using the predefined elevation map or grade map as follows. First, the system 102 inputs latitude/longitude into the predefined map of latitude vs. longitude vs. elevation. In some embodiments, the system 102 may receive the latitude and longitude values from sensor(s) of the personal mobility vehicle 114c. Second, the system 102 may use the previous time step and current time step elevation to calculate vertical displacement, the previous time step latitude and longitude and current time step latitude and longitude to calculate the horizontal displacement, and then the ratio of vertical to horizontal displacement to calculate grade. Finally, the system 102 may use this grade value when calculating the grade force.

Returning to FIG. 6A, at step 614a, once an approximate load value (e.g., mass value) of user 601 is calculated for every point 606, the tandem riding algorithm may calculate a approximate load of the user 601 on the scooter 114c. The approximate load value may be calculated by taking the "middle" value in the set of points 606 (as indicated by line 616), the value for which half of the points may be larger and half may be smaller. By way of an example and without limitation, if for 5 points, the algorithm calculates approximated load values as 41 kg, 43 kg, 45 kg, 47 kg, and 49 kg, the algorithm may calculate the approximate load of the user 601 by taking the middle value of 45 kg.

The transportation management system 102, including the tandem riding detection algorithm 1302, may similarly calculate approximate load of the user 601 associated with other rides, such as Ride 2, Ride 3, . . . , Ride N, as discussed above with respect to Ride 1. For instance, steps 602b, 604b, 610b, and 614b may be repeated to calculate an approximate load (e.g., mass) of the user 601 at a second time instance when the user 601 takes Ride 2. Steps 602n, 604n, 610n, and 614n may be repeated to calculate an approximate load (e.g., mass) of the user 601 at another time instance when the user 601 takes Ride N.

At step 620, once the approximate load values are calculated for a plurality of rides (e.g., Ride 1, Ride 2, . . . , Ride N), the transportation management system 102 may calculate a user profile of the user. The user profile of the user may include, for example and among other things, a threshold, which may be used to classify a future or subsequent user ride as an individual ride or a tandem ride, as discussed later below with respect to FIG. 6B. In particular embodiments, the transportation management system 102 may calculate the user profile (e.g., threshold) from all previous rides within a certain time period (e.g., 3-month time period). While calculating the threshold, the system 102 may weigh recent rides higher to influence the threshold more strongly than older rides. It should be noted that the weighting parameters may change. In particular embodiments, the system 102 may calculate the threshold as follows. First, the system 102 may calculate a weighted average of all previous rides, as follows:

$$\text{Weighted Average} = \left[1 \times a/100 \times \text{out}_1\right] + \left[2 \times a/100 \times \text{out}_2\right] + \qquad (2)$$

$$\ldots \left[\text{numRides} \times a/100 \times \text{out}_{\text{numRides}}\right]$$

Where, numRides = number of rides taken in the certain time period, $$a = 100/n,$$

$$n = 1 + 2 + \ldots \text{numRides},$$

out = calculated approximate load for a ride.

Once the weighted average of all previous rides is obtained, the system 102 may then calculate the threshold, as follows:

$$\text{Threshold} = \text{Weighted Average} * (1 + \text{gain}/100), \qquad (3)$$

$$\text{where gain} = 0 \text{ to } 100\%.$$

By way of an example and without limitation, assume that the user takes 3 rides in the method 600 of FIG. 6A. The system 102 may calculate load for Ride 1 as 45 kg (out₁), load for Ride 2 as 50 kg (out₂), and load for Ride 3 as 60 kg (out₃). Here since there are 3 rides, numRides=3. The value of n is 6 (i.e., n=1+2+3=6). The value of a is 100/6. Gain is 10%. Then having these values, the system 102 may calculate the weighted average as follows:

$$\text{Weighted Average} = \left[1 \times (100/6)/\right.$$

$$\left.100 \times 45\right] + \left[2 \times (100/6)/100 \times 50\right] + \left[3 \times (100/6)/100 \times 60\right].$$

Based on the above example, the system 102 calculates the weighted average of 54.17 kg of the three rides. Given gain of 10%, the threshold may be calculated using the above equation (i.e., Threshold=Weighted Average*(1+gain/100)) as 54.17×1.1=59.6 kg.

At step 622, the transportation management system 102 may store the calculated user profile (e.g., threshold) and data associated with all user rides (e.g., load values calculated for Ride 1, Ride 2, . . . , Ride N) in a user's database 624 or user data store 1414. The data or information stored in the user's database 624 or 1414 may be specific to the user, such as user 601. The system 102 may generate user profiles for other users in a similar manner. That is, method 600 may be repeated to generate and store data associated with a second user for their rides in a second database or in a second portion of the database 624, generate and store data associated with a third user for their rides in a third database or in a third portion of the database 624, and so on. The stored data in the user's database 624 or 1414 may be used by the transportation management system 102 for later access and/or retrieval. For instance, when classifying a subsequent or future ride of the user 601 as tandem ride or individual ride, the tandem riding detection algorithm 1302 may retrieve previous user ride data or user profile (e.g., threshold) from the database 624 and use it to compare the new ride data (e.g., approximate load associated with user's future ride) with the threshold to determine whether the user is individually riding or riding with another user (i.e., tandem riding), as discussed in further detail below with respect to method 650 of FIG. 6B.

FIG. 6B illustrates an example method 650 for classifying a new ride (e.g., subsequent or future ride) of a user (e.g., user 601) as an individual ride or tandem ride. The method 650 begins, at step 652, where the user 601 takes a new ride on the scooter 114c after a short time period. As an example, the user 601 may ride the scooter 114c after three months since their last ride (e.g., Ride N). In the short time period that has passed, the transportation management system 102 may have calculated and stored data relating to the user's previous rides. For instance, the transportation management system 102 has already calculated a threshold based on all previous user rides, as discussed above in method 600 of FIG. 6A.

At step 654, the tandem riding detection algorithm 1302 of the transportation management system 102 may calculate the approximate load of the user 601 associated with the new ride. In particular embodiments, the algorithm may calculate the approximate load of the user 601 using the same methodology as discussed above in FIG. 6A. For instance, the transportation management system 102 may receive ride data (e.g., sensor data) from one or more sensors on the scooter 114c. In particular, the system 102 may collect motor current and speed from motor current sensor and speed sensor, respectively, for various points 656 throughout the new ride. Filtering may be performed to filter out negative currents, low frequency points, low acceleration points, etc. Responsive to filtering, the tandem riding detection algorithm may calculate a load value (e.g., mass value) for every point left after the filtering. Specifically, the algorithm may calculate the load using the equation (1) discussed above. Once an approximate load of user 601 is calculated for every point 656, the tandem riding algorithm may calculate an approximate load of the user 601 on the scooter 114c. In one instance, the representative load value may be calculated by taking the "middle" value in the set of points 656 (as indicated by line 658). In other instances, for example and without limitation, the approximate load value may be calculated by taking a mean load, arithmetic and geometric means, square root, run a simulation and do a Kaman filter and extract a representative value that's not a representative mean (e.g., which is a function of all the data that came out above it), etc.

At step 656, the tandem riding detection algorithm may compare the newly calculated load associated with the new ride to the user profile (e.g., threshold) that it has calculated earlier based on the user's previous rides. In particular embodiments, the algorithm may retrieve the user profile from the user's database 624.

At step 658, based on the comparison, the algorithm may make a determination of whether the new ride is a tandem ride (e.g., two or more riders riding on the scooter 114c) or an individual ride (e.g., only user 601 is riding the scooter 114c). Specifically, the algorithm based on comparing the newly calculated load to the user profile (e.g., threshold) may determine whether the newly calculated load value is greater or less than a threshold associated with the user profile. If the load is greater than the threshold, the tandem riding detection algorithm may categorize or classify the new ride as tandem. Otherwise, if the load is less than the threshold, then the algorithm may classify the new ride as individual. By way of an example and without limitation, the algorithm may have earlier calculated the threshold value as 59.6 kg based on Rides 1-N as shown and discussed in FIG. 6A. For the new ride, the algorithm may have calculated the load as 100 kg. Since the representative load value of 100 kg is greater than the threshold of 59.6 kg, the algorithm may classify the ride as tandem ride. That is, the algorithm may determine that there are two users riding on the scooter 114c. In other words, the algorithm may determine that that is an additional person (e.g., user 302c or 404) riding with the user 601 on the scooter 114c.

At step 660, the user riding the scooter 114c (e.g., scooter) may be warned if the ride is classified as tandem. For instance, if the tandem riding detection algorithm 1302 detects tandem riding, the personal mobility vehicle 114c may receive instructions from the transportation management system 102 to present one or more notifications to the user. Upon receiving the instructions, the user interface module 213 of the scooter 114c may present one or more notifications based on the received instructions. In some instances, a notification may be presented to the user in the form of a visual notification. For instance, the user interface module 213 may present a visual notification on the display screen 210 of the scooter 114c. For example, a visual notification such as "tandem riding is not suitable for this scooter" may be presented on the display screen of the scooter 114c, as shown for example in FIG. 11A. As another example, a notification such as "you can be fined for tandem riding" may be displayed to the user 601, as shown for example in FIG. 11B. As yet another example, a notification such as "tandem riding is prohibited or not allowed in this area" may be displayed to the user 601, as shown for example in FIG. 11C. In some embodiments, these visual notifications may be presented either on a display screen of the scooter 114c or on a device (e.g., requestor's device 104) associated with the user 601. In some embodiments, a notification may also be presented to the user in the form of an alert, such as sound alert, alarm, vibrations, etc. For example, upon receiving the instructions from the transportation management system 102 that tandem riding has been detected, the scooter 114c may produce a sound to alert the user 601 of the tandem riding, as shown for example in FIG. 11D.

In one embodiment, the personal mobility vehicle 114c may be able to locally detect tandem riding or classify a ride as individual/tandem. For instance, the steps 654-660 as shown and discussed in FIG. 6B may be performed by a computer system of the personal mobility vehicle 114c. In such an embodiment, the personal mobility vehicle 114c may retrieve a user profile (e.g., threshold) for ride classification from the transportation management system 102. To retrieve a user profile of the user, the computer system of the personal mobility vehicle 114c may determine a user identity and measure sensor data using one or more sensors of the vehicle 114c. The wireless communication module 220 of the vehicle 114c may send the user identity and the sensor data to the transportation management system 102 for data relating to the user's previous rides, such as, for example, user profile of the user (e.g., threshold calculated based on previous rides). The transportation management system 102 may retrieve the requested data (e.g., threshold) from the user's data store 624 or 1414 and send the data to the personal mobility vehicle 114c. For classifying or categorizing a particular ride, a computer system on the personal mobility vehicle 114c may locally estimate an approximate load on the vehicle 114c (e.g., using equation (1) discussed above) and compare the approximate load with the user profile of the user (e.g., threshold) received from the system 102. Based on the comparison, the computer system may classify the particular ride as individual or tandem, as discussed elsewhere herein. Once the ride is detected as tandem, the computer system of the personal mobility vehicle 114c may trigger one or more components of the vehicle 114c to perform one or more actions with respect to tandem riding. For example, the controller 212 may restrict the movement of the vehicle to avoid tandem riding, the user interface module 213 may warn/notify the riding users of tandem riding or consequences associated with the tandem riding via visual notifications, the controller 212 may trigger an alarm to warn the riding users, etc.

Figure 10A:
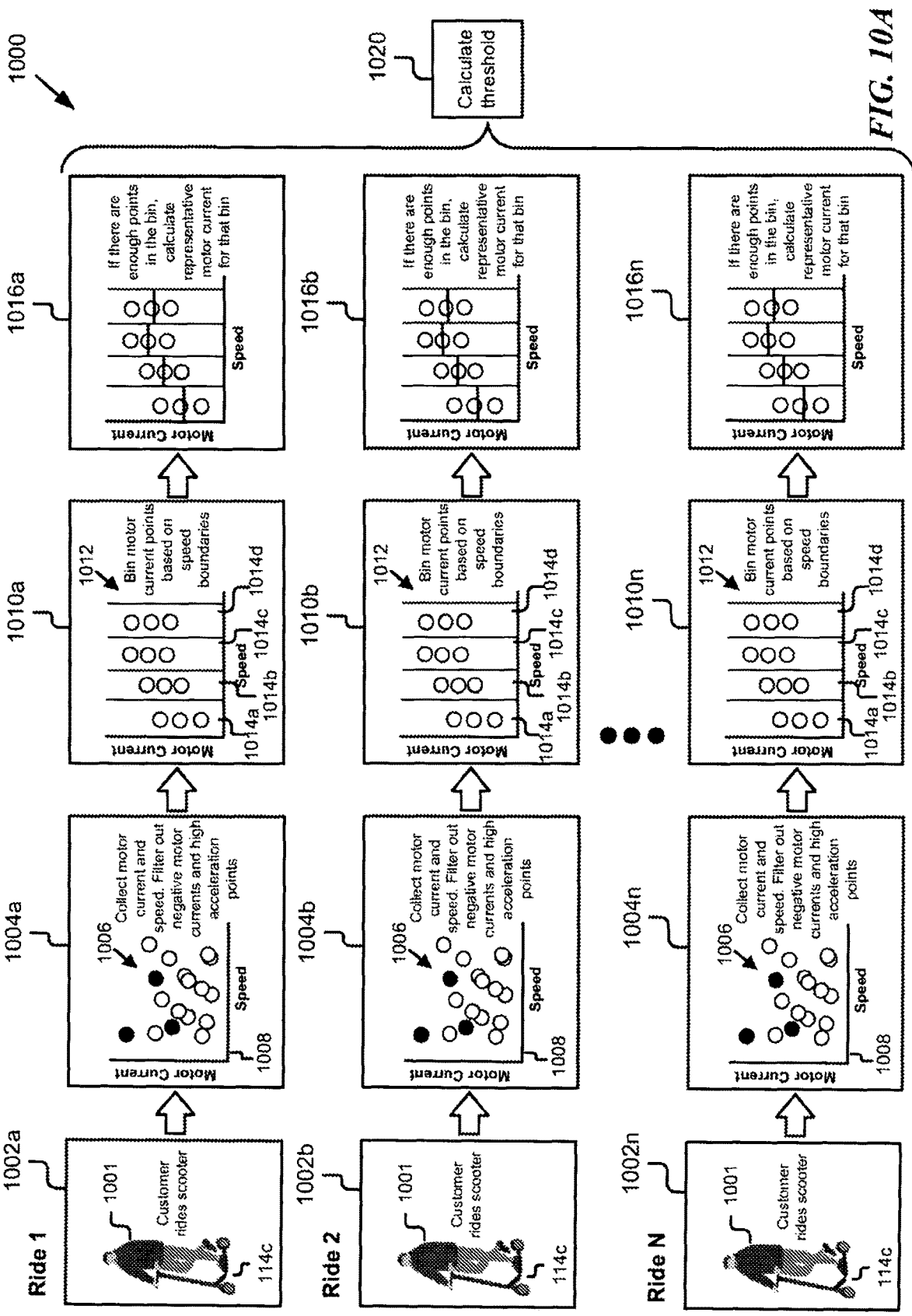
FIGS. 10A-10B illustrate another example methodology for detecting tandem riding, in accordance with particular embodiments.
Figure 10B:
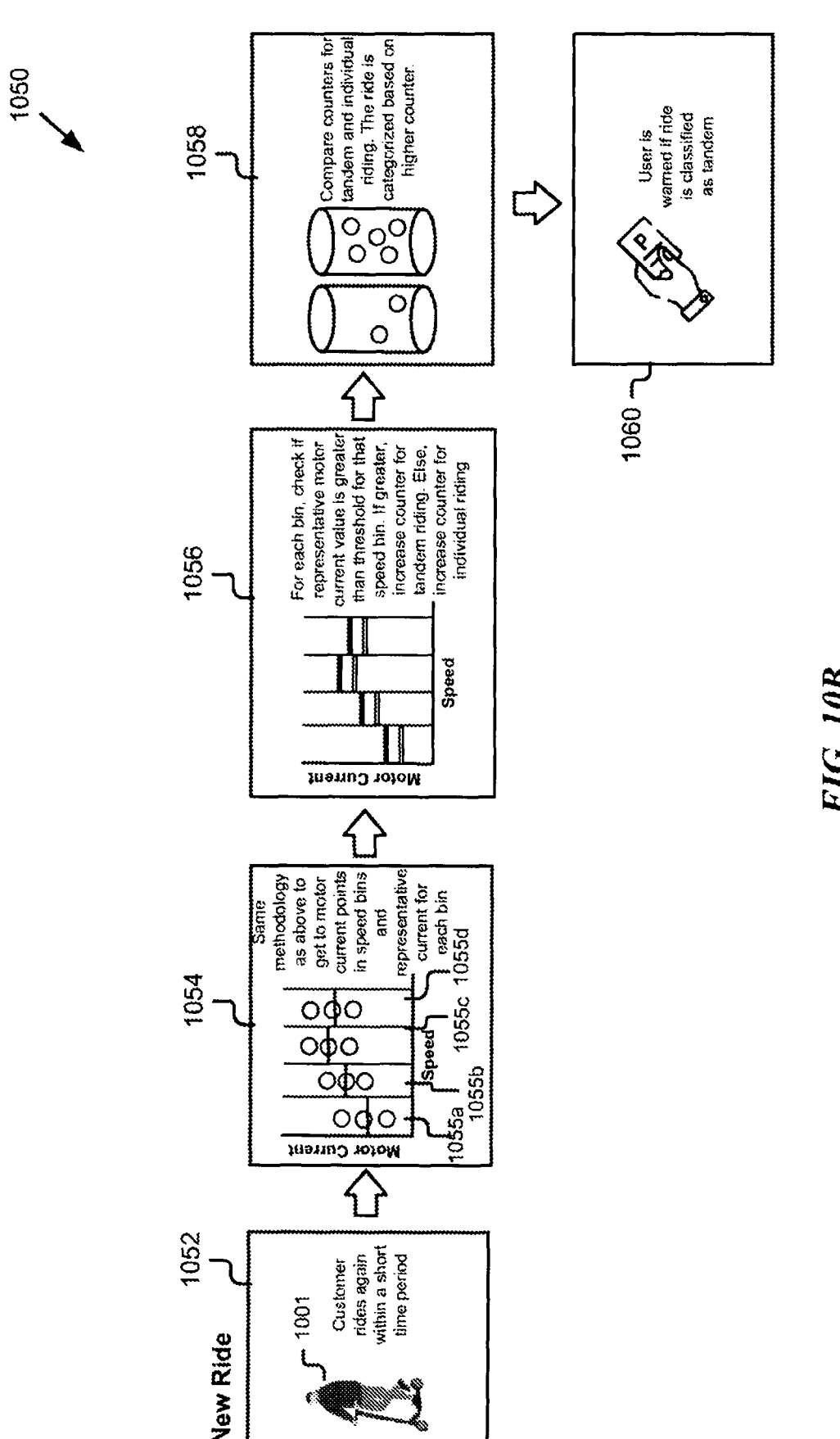

FIGS. 10A-10B illustrate another example methodology for detecting tandem riding, in accordance with particular embodiments. The methodology in FIGS. 10A-10B relies on motor currents and speeds of a personal mobility vehicle 114c (or scooter 114c) that a user 1001 is riding. At a high level, instead of estimating load of the user (as was discussed in FIGS. 6A-6B), here motor currents are observed for different speeds and categorized into speed bins. Generally, there will be more motor current produced by the scooter 114c when the user 1001 is tandem riding than when they are individually riding. Stated differently, with increased weight of a second rider riding on the scooter 114c, the motor current required to maintain a certain speed also increases. The transportation management system 102 may use this observation of motor currents at different speed bins to categorize a ride as an individual ride or tandem ride.

Referring to FIG. 10A, an example method 1000 is illustrated for collecting ride data associated with a plurality of rides and calculating a threshold. Here the ride data corresponds to sensor data, including motor currents generated at different speeds of the scooter 114c. Ride data for the plurality of rides, including ride 1, ride 2, . . . , ride N, may be collected over a certain time period. By way of an example and without limitation, the transportation management system 102 may collect ride data for a week, a month, etc. In some embodiments, ride data over a certain time period (e.g., a week, a month) may be needed before the tandem riding detection algorithm may do its tandem riding classification. Specific method for collecting the ride data and calculating approximate/representative motor current (e.g., median motor current) for a speed bin is now discussed in detail below with respect to one example ride, such as Ride 1.

The method 1000 begins, at step 1002a, where the user 1001 takes their first ride on the scooter 114c. As the user 1001 is riding the scooter, one or more sensors on the scooter 114c may measure their respective sensor data. For example, a motor current sensor may measure motor current and a speed sensor may measure the speed of the scooter at various points (e.g., points 1006) throughout the ride. Sensors may take their measurements at periodic time intervals, such as, for example, at every couple of seconds, at every minute, every couple of minutes, etc. As discussed elsewhere herein. signals may be recorded at the same time or within a short time frame in order to reduce error.

At step 1004a, the transportation management system 102 may collect ride data from the various sensors of the scooter 114c. For instance, the sensors of the scooter 114c may be configured to send their data to the transportation management system 102 via the wireless communications module 220. As shown, the system 102 may collect motor current and speed from motor current sensor and speed sensor, respectively, for various points 1006 (individually and/or collectively referred to as 1006) throughout Ride 1. An example current-speed chart 1008 illustrates points 1006 reflecting motor currents generated at various speeds throughout Ride 1. In some embodiments, the system 102 may filter out some of the accumulated data points 1006 (e.g., sensor data). For instance, the system 102 may filter out points during the ride with negative motor currents and high acceleration. These points, if not filtered, may lead to error in tandem riding detection, as discussed elsewhere herein.

At step 1010a, the transportation management system 102 may bin or categorize the motor current points 1006 after filtering into different speed boundaries. For instance, the transportation management system 102 may determine various speeds that it has received from the speed sensor of the scooter 114c, generate different speed bins (e.g., speed bins 1014*a*-1014*d*) corresponding to different speed ranges, and put motor current points associated with particular speeds into respective speed bins. As an example, the motor current points associated with speed 5 mph are put into 0-10 mph speed bin, motor current points associated with 25 mph are put into 20-30 mph speed bin, and motor current points associated with 37 mph are put into 30-40 mph speed bin. Chart 1012 illustrates an example allocation of motor current points into different speed bins 1014*a*, 1014*b*, 1014*c*, and 1014*d* (individually and/or collectively herein referred to as 1014).

At step 1016*a*, the transportation management system 102 may calculate a representative, e.g. median, motor current for each speed bin 1014. The approximate or representative motor current value in each bin 1014 may be calculated, for example, by taking the "middle" value, as indicated by respective horizontal lines in the speed bins 1014. In some embodiments, there should be a certain number of motor current points in a speed bin before a representative motor current may be calculated. As an example, there should be at least 3 motor current points in the speed bin before a representative motor current value (e.g., median value) may be calculated.

The transportation management system 102, including the tandem riding detection algorithm, may similarly calculate approximate or representative motor current of the scooter 114*c* in different speeds bins for other rides, such as Ride 2, Ride 3, . . . , Ride N. For instance, steps 1002*b*, 1004*b*, 1010*b*, and 1016*b* may be repeated to calculate representative motor currents of the scooter 114*c* at different speeds during Ride 2. Steps 1002*n*, 1004*n*, 1010*n*, and 1016*n* may be repeated to calculate representative motor currents of the scooter 114*c* at different speeds during Ride N.

At step 1020, once the approximate or representative motor currents are calculated for the plurality of rides (e.g., Ride 1, Ride 2, . . . , Ride N), the transportation management system 102 may calculate a threshold. The threshold may be used to classify a future user ride (e.g., user ride after a certain time period) as an individual ride or a tandem ride, as discussed later below with respect to FIG. 10B. In particular embodiments, the transportation management system 102 may calculate the threshold from all previous rides within a certain time period (e.g., 3-month time period). While calculating the threshold, the system 102 may weigh recent rides higher to influence the threshold more strongly than older rides. In particular embodiments, the system 102 may calculate the threshold in a similar way as discussed above in reference to FIG. 6A. For instance, the following same two equations may be used to calculate the threshold:

$$\text{Weighted Average} = \left[1 \times a/100 \times \text{out}_1\right] + \left[2 \times a/100 \times \text{out}_2\right] +$$
$$\ldots \left[numRides \times a/100 \times \text{out}_{numRides}\right]$$

$$\text{Threshold} = \text{Weighted Average} * \left(1 + \text{gain}/100\right)$$

Where, $numRides$ = number of rides taken in the certain time period, $$a = 100/n,$$
$$n = 1 + 2 + \ldots numRides,$$

out = calculated representative motor current for speed bin, $$\text{Gain} = 0 \text{ to } 100\%$$

FIG. 10B illustrates an example method 1050 for classifying a new ride (e.g., subsequent or future ride) of a user (e.g., user 1001) as an individual ride or tandem ride. The method 1050 begins, at step 1052, where the user 1001 takes a new ride on the scooter 114*c* after a short time period. As an example, the user 1001 may ride the scooter 114*c* after three months since their last ride (e.g., Ride N). In the short time period that has passed, the transportation management system 102 may have calculated and stored data relating to the user's previous rides. For instance, the transportation management system 102 has already calculated a threshold based on all previous user rides, as discussed above in method 1000 of FIG. 10A.

At step 1054, the tandem riding detection algorithm of the transportation management system 102 may use the same methodology as discussed in method 1000 of FIG. 10A to get motor current points in speed bins and calculate representative motor current for each bin. For instance, the transportation management system 102 may receive ride data (e.g., sensor data) from one or more sensors of the scooter 114*c*. In particular, the system 102 may collect motor current and speed from motor current sensor and speed sensor, respectively, for various points throughout the new ride. Filtering may be performed to filter out negative motor currents and high acceleration points. Responsive to filtering, the tandem riding detection algorithm may bin or categorize the motor current points left after filtering into different speed boundaries or bins, such as speed bins 1055*a*, 1055*b*, 1055*c*, and 1055*d* (individually and/or collectively herein referred to as 1055). After putting the motor currents into their respective bins, the algorithm may calculate a representative motor current for each speed bin 1055.

At step 1056, the tandem riding detection algorithm may determine, for each speed bin, if the motor current in that bin is greater than that bin's threshold. If it is greater, then a counter for tandem riding is incremented. Otherwise, a counter for individual riding is incremented.

At step 1058, the tandem riding detection algorithm may compare the counters for tandem and individual riding. The ride is categorized based on the higher counter. For instance, if the tandem riding counter is higher than the individual riding counter, then the ride is categorized as tandem. Otherwise, the ride is categorized as an individual ride.

At step 1060, the user riding the scooter 114*c* (e.g., scooter) may be warned if the ride is classified as tandem. For instance, if the tandem riding detection algorithm detects tandem riding, the personal mobility vehicle 114*c* may receive instructions from the transportation management system 102 to present one or more notifications to the user. A notification may be presented to the user in the form of a visual notification or as an alert (e.g., alarm, sound alert, etc.), as discussed elsewhere herein.

Figure 11A:
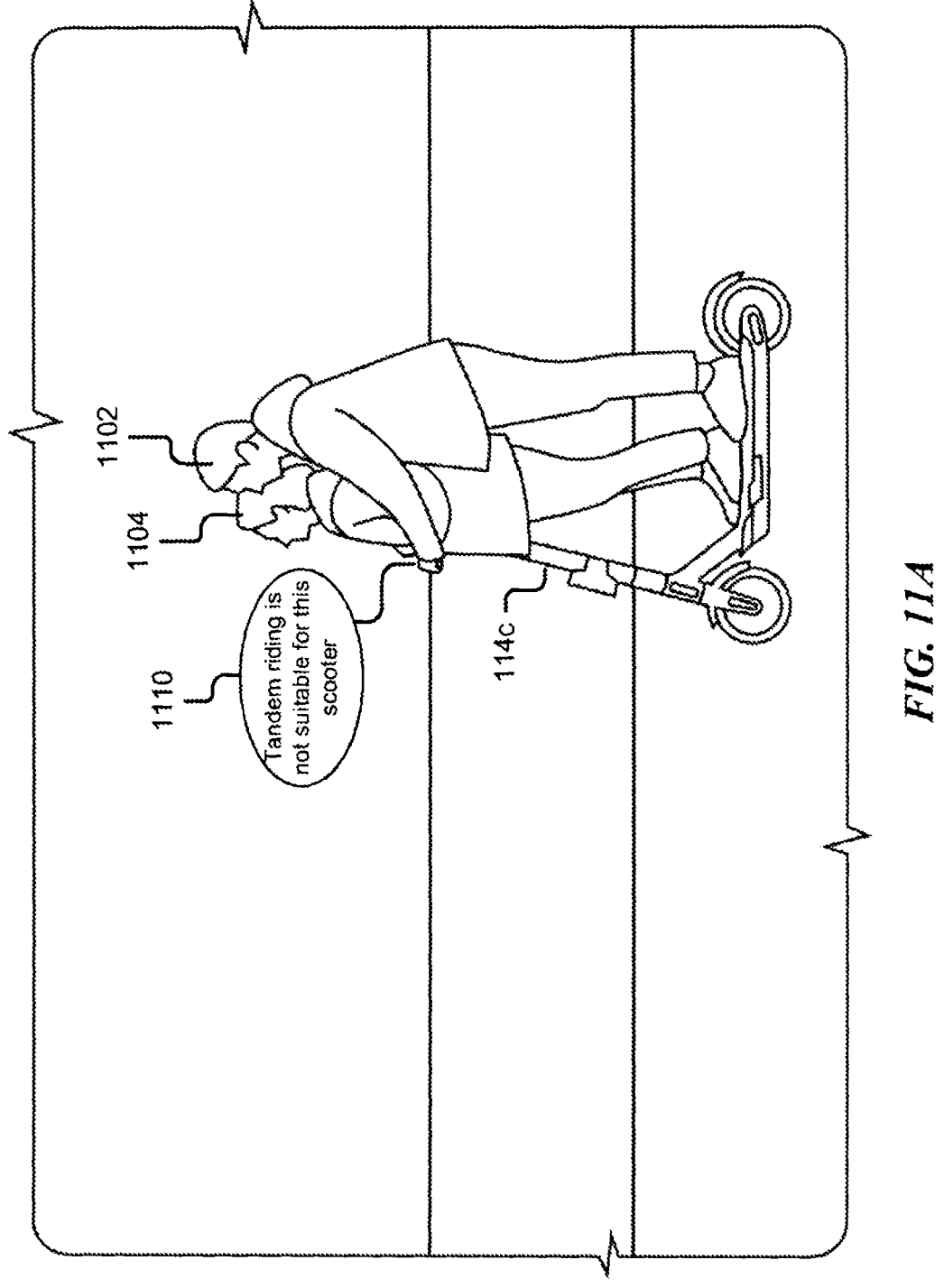
FIGS. 11A-11D illustrate example notifications or alerts that may be provided in case of tandem riding.
Figure 11B:
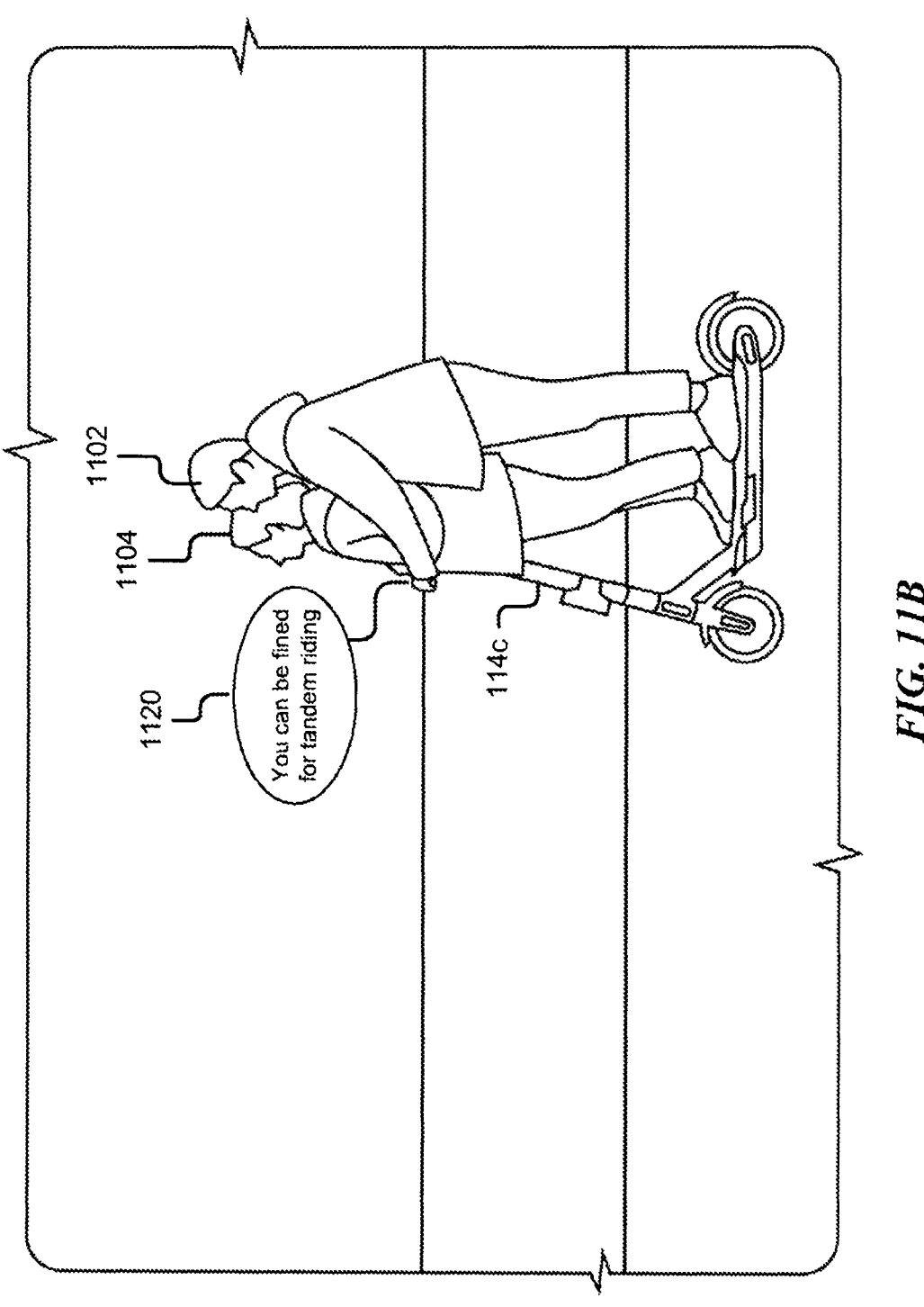

FIGS. 11A-11D illustrate example notifications or alerts that may be provided in case of tandem riding. A user 1102 riding the scooter 114*c* with another user 1104 may be warned for tandem riding. Users 1102 and/or 1104 may be warned via visual notifications or alerts. These notifications or alerts may be configured to inform the riding users of tandem riding and/or consequences associated with tandem riding. In some embodiments, the notifications may be displayed on a display screen (e.g., display screen 210) of the scooter 114*c*. In some other embodiments, the notifications may be sent to a mobile device (e.g., requestor's device 110) associated with primary user 1102 of the scooter 114*c*. FIG. 11A illustrates an example first notification 1110 warning the riding users of the scooter 114*c* that tandem riding is not suitable for the scooter 114*c*. FIG. 11B illustrates an example second notification 1120 warning the riding users of the scooter 114*c* that they can be fined for tandem riding.

Figure 11C:
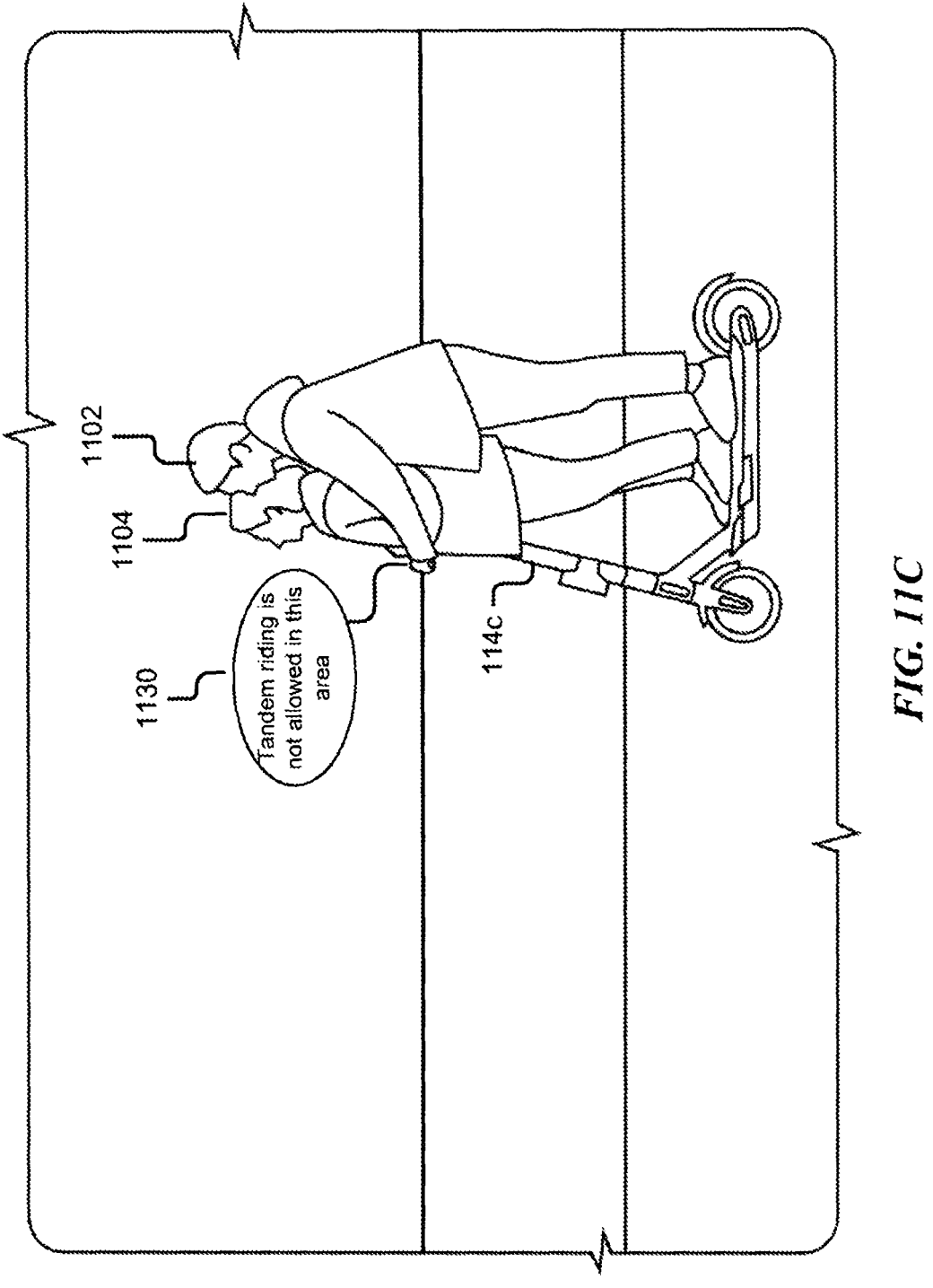
Figure 11D:
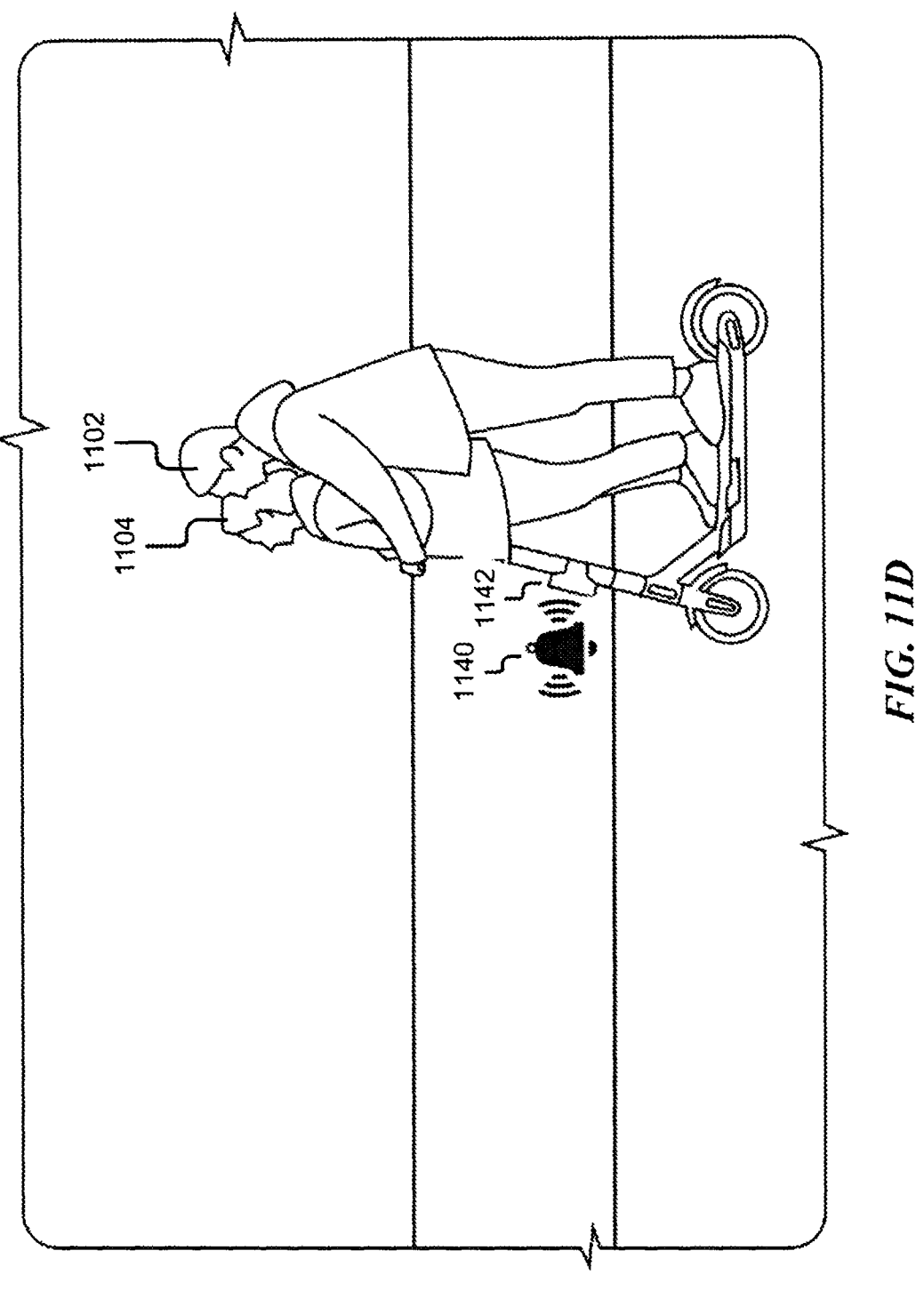

FIG. 11C illustrates an example third notification 1130 warning the riding users of the scooter 114*c* that tandem riding is not allowed or restricted in a certain area where they are riding. FIG. 11D illustrates an example alert 1140 on the scooter 114*c* to warn the riding users of tandem riding. In particular, a speaker 1142 on the scooter 114*c* may trigger an alarm or sound alert 1140 in response to receiving instructions from the transportation management system 102 that tandem riding has been detected.

In some embodiments, one or more actions may be taken in response to providing the notifications (e.g., notifications 1110, 1120, 1130) or alerts (e.g., alert 1140). As an example, the primary user 1102 may stop or park the scooter 114*c* at a safe area, drop-off the user 1104, and start individually riding the scooter 114*c*. In some embodiments, the scooter 114*c* may itself perform an action in response to tandem riding detection. For example, the scooter 114*c* may apply its brakes to jam movement of the scooter 114*c* and notify the riding users (e.g., users 1102 and 1104) for such action through a notification, such as notification 1110, 1120, or 1130.

FIG. 12 illustrates an example method 1200 for classifying a ride on a personal mobility vehicle as an individual ride or a tandem ride, in accordance with particular embodiments. The method may begin at step 1210, where a computing system (e.g., transportation management system 102 or the computer system 1500) may collect, for each ride of a plurality of rides, first ride data associated with a user riding a personal mobility vehicle during a certain time period (e.g., 3 months), as discussed, for example, in reference to FIG. 6A. The first ride data may include sensor data from one or more sensors of the personal mobility vehicle, such as the personal mobility vehicle or scooter 114*c*. The one or more sensors may include, for example, an orientation sensor, a motor current sensor, a speed sensor, an accelerometer, a gyroscope, or a GPS sensor. In particular embodiments, the personal mobility vehicle discussed herein is a scooter.

In some embodiments, one or more portions of the first ride data that may lead to error in load calculation may be filtered out. At step 1220, the computing system may calculate, for each ride of the plurality of rides, an approximate load on the personal mobility vehicle based on at least the first ride data. In some embodiments, the approximate load on the personal mobility vehicle may include an approximate or rough weight/mass of the user riding on the personal mobility vehicle at a particular time instance during the certain time period. In particular embodiments, the computing system may calculate the approximate load on the personal mobility vehicle based on at least the first ride data by (1) determining motor currents and speeds for a plurality of points during the ride based on the first ride data, (2) filtering out one or more points from the plurality of points that lead to error in load calculation, (3) calculating, for each point after the filtering, an approximate load value, and (4) calculating a representative load, e.g., by taking a median of load values associated with the plurality of points, as discussed above in reference to at least FIG. 6A. In some embodiments, calculating an approximate load value may include estimating one or more of an aero force, an inertial force, a rolling resistance force, or a grade force.

At step 1230, the computing system may calculate a user profile based on approximate loads associated with the plurality of rides during a certain time period. The user profile of the user may include a threshold. By way of an example and without limitation, assuming that the plurality of rides taken during the certain period is 3 rides and that load for Ride 1 is 45 kg, load for Ride 2 is 50 kg, and load for Ride 3 is 60 kg, the computing system, using the equations (2) and (3) discussed above, may calculate the threshold as 59.6 kg.

At step 1240, the computing system may collect, for a subsequent ride, second ride data associated with the user riding a current personal mobility vehicle after a certain time period (e.g., after 3 months). The current personal mobility vehicle may be a different vehicle (e.g., different scooter) or the same vehicle (e.g., same scooter) as was used by the user during the certain time period. The subsequent ride may come after the last ride of the plurality of rides taken during the certain time period. The second ride data may include sensor data from one or more sensors of the current personal mobility vehicle, such as the personal mobility vehicle or scooter 114*c*. At step 1250, the computing system may calculate, for the subsequent ride, a second approximate load on the current personal mobility vehicle based on at least the second ride data. The system may calculate the second approximate load in a similar way as the approximate load based on the first ride data was calculated, as discussed above in step 1220. In some embodiments, the second approximate load on the current personal mobility vehicle may include an approximate or rough weight/mass of the user riding on the current personal mobility vehicle at a second instance after a certain time period.

At step 1260, the computing system may compare the second approximate load to the user profile of the user. Specifically, the computing system may compare the second approximate load to a threshold associated with the user profile of the user. At step 1270, the computing system may make a determination of whether the second approximate load associated with the subsequent ride is greater or less than the threshold. If the second approximate load is less than the threshold, at step 1275, the computing system may classify the subsequent ride as an individual ride (e.g., a single user is riding the scooter 114*c* as shown in FIG. 3A). On the other hand, if the second approximate load is greater than the threshold, at step 1280, the computing system may classify the subsequent ride as a tandem ride (e.g., two users are riding on the scooter 114*c* as shown in FIG. 3B or 4). At step 1290, in response to classifying the subsequent ride as the tandem ride, the computing system may send instructions to the personal mobility vehicle to perform one or more actions. The one or more actions may include notifying the user of tandem riding or consequences associated with the tandem riding, as shown and discussed for example with respect to FIGS. 11A-11D. In some embodiments, the one or more actions may include jamming or restricting movement of the personal mobility vehicle.

Particular embodiments may repeat one or more steps of the method of FIG. 12, where appropriate. Although this disclosure describes and illustrates particular steps of the method of FIG. 12 as occurring in a particular order, this disclosure contemplates any suitable steps of the method of FIG. 12 occurring in any suitable order. Moreover, although this disclosure describes and illustrates an example method for classifying a ride on a personal mobility vehicle as an individual ride or a tandem ride, including the particular steps of the method of FIG. 12, this disclosure contemplates any suitable method for classifying a ride on a personal mobility vehicle as an individual ride or a tandem ride, including any suitable steps, which may include a subset of the steps of the method of FIG. 12, where appropriate. Furthermore, although this disclosure describes and illustrates particular components, devices, or systems carrying out particular steps of the method of FIG. 12, this disclosure contemplates any suitable combination of any suitable components, devices, or systems carrying out any suitable steps of the method of FIG. 12. As an example, steps 1210-1290 may be performed by the transportation management system 102. As another example, steps 1210-1280 may be performed by the personal mobility vehicle 114c. As yet another example, steps 1210-1290 may be performed by a combination of the transportation management system 102 and the personal mobility vehicle 114c. For instance, steps 1210-1230 may be performed by the transportation management system 102 and steps 1240-1280 may be performed by the personal mobility vehicle 114c.

Figure 13:
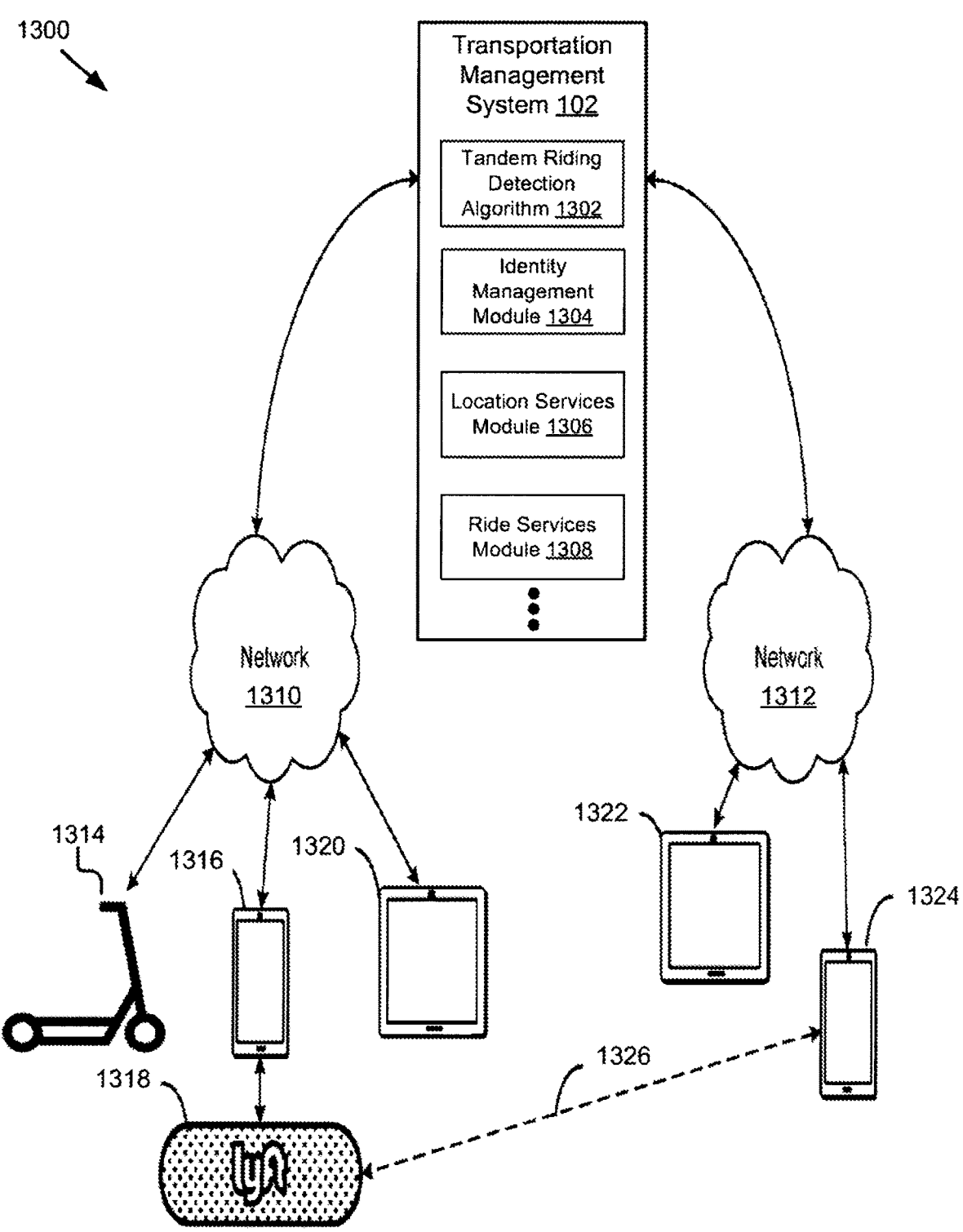
FIG. 13 shows an example network environment associated with a transportation management system, in accordance with various embodiments.

FIG. 13 shows an example network environment 1300 associated with the transportation management system 102, in accordance with various embodiments. As shown in FIG. 13 and discussed elsewhere herein, the transportation management system 102 may be configured to provide various services to requestor devices. For example, the transportation management system 102 may be configured to allocate a personal mobility vehicle (e.g., personal mobility vehicle 114c) to a requestor (e.g., requestor 112), detect whether the requestor is tandem riding on the personal mobility vehicle, and perform an action in response to detecting tandem riding. The transportation management system 102 may run one or more services, algorithms, or software applications, including a tandem riding detection algorithm 1302, an identity management module 1304, a location services module 1306, ride services module 1308, or other services. Although four services, modules, or applications are shown as being provided by the transportation management system 102, more or fewer services may be provided in various implementations. In various embodiments, the transportation management system 102 may include one or more general purpose computers, server computers, clustered computing systems, cloud-based computing systems, or any other computing systems or arrangements of computing systems. The transportation management system 102 may be configured to run any or all of the services, modules, algorithms, and/or software applications described with respect to various embodiments described herein. In some embodiments, the transportation management system 102 may run any appropriate operating system as well as various server applications, such as common gateway interface (CGI) servers, JAVA® servers, hypertext transport protocol (HTTP) servers, file transfer protocol (FTP) servers, database servers, etc.

In particular embodiments, the tandem riding detection algorithm 1302 may be configured to detect whether a ride on a personal mobility vehicle (e.g., scooter 114c) is an individual ride (e.g., a single user riding on the scooter) or a tandem ride (e.g., two or more users riding on the scooter). In some embodiments, the algorithm 1302 may be configured to classify or categorize a ride as individual or tandem based on the load estimation methodology as discussed in FIGS. 6A-6B. For instance, the tandem riding detection algorithm 1302 may be configured to perform steps 604, 610, 614, 620, 622, 654, 656, 658, and 660, as discussed above in methods 600 and 650 of FIGS. 6A-6B. In some embodiments, the algorithm 1302 may be configured to classify or categorize a ride as individual or tandem based on the motor currents and speed bins methodology as discussed in FIGS. 10A-10B. For instance, the tandem riding detection algorithm 1302 may be configured to perform steps 1004, 1010, 1016, 1020, 1054, 1056, 1058, and 1060, as discussed above in methods 1000 and 1050 of FIGS. 10A-10B.

The identity management module 1304 may be configured to manage various identity services, such as access management and authorization services for requestors when interacting with the transportation management system 102. This may include, e.g., authenticating the identity of a requestor (e.g., requestor 112) and determining whether the requestor is authorized to receive requested services through the transportation management system 102. Identity management module 1304 may also control access to requestor data maintained by the transportation management system 102, such as ride histories, ride data, personal data, or other user data. Location services module 1306 may be configured to manage navigation and/or traffic management services and user interfaces, or other location services.

In various embodiments, ride services module 1308 may include ride matching and management services to connect a requestor to a personal mobility vehicle (e.g., personal mobility vehicle 114c) or a vehicle (e.g., vehicle 106). Ride services module 1308 may receive data from requestors through applications executing on their respective devices. Ride services module 1308 may, e.g., confirm the identity of requestors using identity management module 1304, and determine that each user is authorized for the requested ride service. In some embodiments, the ride services module 1308 may identify an appropriate vehicle for a requestor using a location obtained from the requestor and in cooperation with the location services module 1306 to identify, e.g., a closest vehicle. As such, ride services module 1308 may manage the distribution and allocation of various vehicles, including the personal mobility vehicles 114a-114c and vehicle 106, to requestors, consistent with embodiments described herein.

The transportation management system 102 may connect to various devices through network 1310 and 1312. Networks 1310, 1312 may include any network configured to send and/or receive data communications using various communication protocols, such as transmission control protocol/Internet protocol (TCP/IP), Internet packet exchange (IPX), systems network architecture (SNA), etc. In some embodiments, networks 1310, 1312 may include local area networks (LAN), such as Ethernet, Token-Ring or other LANs. Networks 1310, 1312 may include a wide-area network and/or the Internet. In some embodiments, networks 1310, 1312 can include VPNs (virtual private networks), PSTNs (a public switched telephone networks), infra-red networks, or any wireless network, including networks implementing the IEEE 802.11 family of standards, Bluetooth®, Bluetooth® Low Energy, NFC and/or any other wireless protocol. In various embodiments, networks 1310, 1312 may include a mobile network, such as a mobile telephone network, cellular network, satellite network, or other mobile network. Networks 1310, 1312 may be the same as communication network 108 in FIG. 1. In some embodiments, networks 1310, 1312 may each include a combination of networks described herein or other networks as are known to one of ordinary skill in the art.

Users may utilize one or more services provided by the transportation management system 102 using applications executing on provider and requestor devices. Provider computing devices 1314, 1316, 1318, and/or 1320 may be associated with the personal mobility vehicles 114a-114c and vehicle 106. These provider computing devices 1314, 1316, 1318, and/or 1320 may be attached to or integrated within or as part of the personal mobility vehicles 114a-114c and vehicle 106. Requestor computing devices 1322 and 1324 may be associated with requestors, such as requestor 112. A requestor 112 may use a requestor computing device 1322 or 1324 to communicate with a provider computing device 1314, 1316, 1318, or 1320, or with the transportation management system 102. As shown in FIG. 13, provider computing devices 1314, 1316, 1318, and/or 1320, and requestor computing devices 1322 and 1324 may include mobile devices (e.g., mobile telephone, tablet computer, a personal digital assistant (PDA)), wearable devices (e.g., head mounted displays, etc.), thin client devices, gaming consoles, or other devices configured to communicate over one or more networks 1310, 1312. Each provider or requestor device may execute various operating systems (e.g., Android, IOS, etc.) and configured to communicate over the Internet, Blackberry® messenger, short message service (SMS), email, and various other messaging applications and/or communication protocols. The requestor and provider computing devices may include general purpose computers (e.g., personal computers, laptop computers, or other computing devices executing operating systems such as macOS®, Windows®, Linux®, various UNIX® or UNIX- or Linux-based operating systems, or other operating systems). In some embodiments, provider computing device 1314 may include a vehicle-integrated computing device, such as a vehicle navigation system, a display device, or other computing device integrated with the vehicle itself.

In some embodiments, provider computing device 1318 may include a provider communication device configured to communicate with users, such as drivers, passengers, pedestrians, riders, and other users. In some embodiments, provider communication device 1318 may communicate directly with the transportation management system 102 or through another provider computing device, such as provider computing device 1316. In some embodiments, a requestor computing device 1324 may communicate 1326 directly with the provider communication device 1318 over a peer-to-peer connection, Bluetooth connection, NFC connection, ad hoc wireless network, or any other communication channel or connection. Although particular devices are shown as communicating with the transportation management system 102 over networks 1310 and 1312, in various embodiments, the transportation management system 102 may expose an interface, such as an application programming interface (API) or service provider interface (SPI) to enable various third parties which may serve as an intermediary between end users and the transportation management system 102.

Although the example network environment 1300 is shown with four provider devices and two requestor devices, any number of devices may be supported. The various components shown and described herein may be implemented in hardware, firmware, software, or combinations thereof. Although one embodiment of a network environment 1300 associated with the transportation management system 102 is depicted in FIG. 13, this is merely one implementation and not meant to be limiting.

Figure 14:
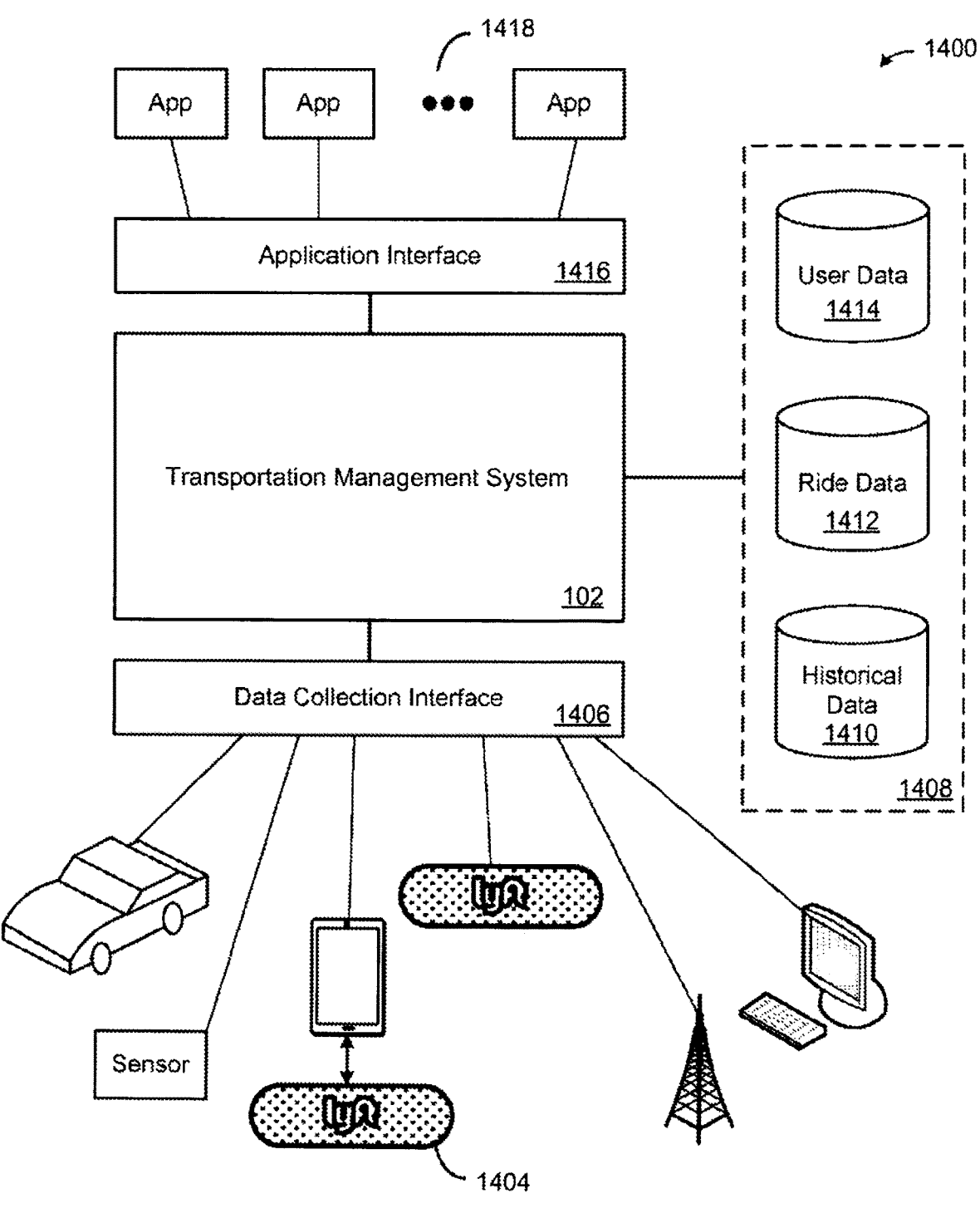
FIG. 14 shows a data collection and application management environment, in accordance with various embodiments.

FIG. 14 shows a data collection and application management environment 1400, in accordance with various embodiments. As shown in FIG. 14, the transportation management system 102 may be configured to collect data from various data collection devices 1404 through a data collection interface 1406. As discussed above, the transportation management system 102 may include one or more computers and/or servers or any combination thereof. Data collection devices 1404 may include, but are not limited to, user devices (including provider and requestor computing devices, such as those discussed above), provider communication devices, laptop or desktop computers, vehicle data (e.g., from sensors integrated into or otherwise connected to vehicles), ground-based or satellite-based sources (e.g., location data, traffic data, weather data, etc.), or other sensor data (e.g., roadway embedded sensors, traffic sensors, etc.). Data collection interface 1406 may include, e.g., an extensible device framework configured to support interfaces for each data collection device. In various embodiments, data collection interface 1406 may be extended to support new data collection devices as they are released and/or to update existing interfaces to support changes to existing data collection devices. In various embodiments, data collection devices 1404 may communicate with data collection interface 1406 over one or more networks. The networks may include any network or communication protocol as would be recognized by one of ordinary skill in the art, including those networks discussed above.

As shown in FIG. 14, data received from data collection devices 1404 may be stored in data store 1408. Data store 1408 may include one or more data stores, such as databases, object storage systems and services, cloud-based storage services, and other data stores. For example, various data stores may be implemented on a non-transitory storage medium accessible to the transportation management system 102, such as historical data store 1410 (e.g., including data related to user's previous rides), ride data store 1412 (e.g., including ride data as discussed in FIGS. 6A-6B or FIGS. 10A-10B), and user data store 1414 (e.g., including data related to users such as approximate or representative loads during rides, thresholds, etc.). Data stores 1408 may be local to the transportation management system 102, or remote and accessible over a network, such as those networks discussed above or a storage-area network or other networked storage system. In various embodiments, historical data 1410 may include historical traffic data, weather data, request data, road condition data, or any other data for a given region or regions received from various data collection devices. Ride data 1412 may include route data, request data, timing data, and other ride related data, in aggregate and/or by requestor or provider. In some embodiments, the ride data 1412 may include motor currents observed at various speeds during a plurality of rides on a personal mobility vehicle, such as vehicle 114c. User data 1414 may include user account data, preferences, location history, and other user-specific data. In some embodiments, user data 1414 may include approximate loads (e.g., mass) of a user during a plurality of rides on a personal mobility vehicle, such as vehicle 114c. Although particular data stores are shown, any data collected and/or stored according to the various embodiments described herein may be stored in data stores 1408.

As shown in FIG. 14, an application interface 1416 may be provided by the transportation management system 102 to enable various applications (apps) 1418 to access data and/or services available through the transportation management system 102. Apps 1418 may run on various user devices (including provider and requestor computing devices, such as those discussed above) and/or may include cloud-based or other distributed apps configured to run across various devices (e.g., computers, servers, or combinations thereof). Apps 1418 may include, e.g., aggregation and/or reporting apps which may utilize data 1408 to provide various services (e.g., third-party ride request and management apps). In various embodiments, application interface 1416 may include an API and/or SPI enabling third party development of apps 1418. In some embodiments, application interface 1416 may include a web interface, enabling web-based access to data 1408 and/or services provided by the transportation management system 102. In various embodiments, apps 1418 may run on devices configured to communicate with application interface 1416 over one or more networks. The networks may include any network or communication protocol as would be recognized by one of ordinary skill in the art, including those networks discussed above, in accordance with an embodiment of the present disclosure.

Although a particular implementation of environment 1400 is shown in FIG. 14, this is for illustration purposes only and not intended to be limited. In some embodiments, environment 1400 may include fewer or more components, as would be recognized by one or ordinary skill in the art.

Figure 15:
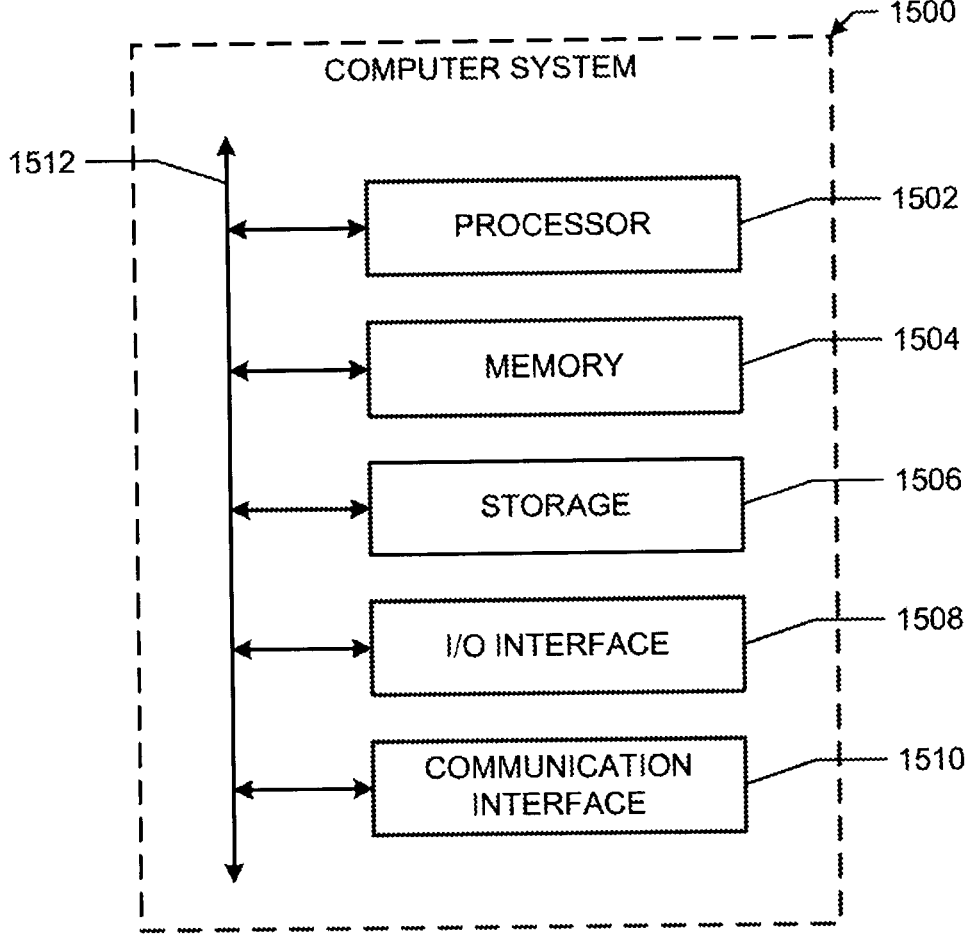
FIG. 15 illustrates an example of a computing system.

FIG. 15 illustrates an example computer system 1500. In particular embodiments, one or more computer systems 1500 perform one or more steps of one or more methods described or illustrated herein. In particular embodiments, one or more computer systems 1500 provide the functionalities described or illustrated herein. In particular embodiments, software running on one or more computer systems 1500 performs one or more steps of one or more methods described or illustrated herein or provides the functionalities described or illustrated herein. Particular embodiments include one or more portions of one or more computer systems 1500. Herein, a reference to a computer system may encompass a computing device, and vice versa, where appropriate. Moreover, a reference to a computer system may encompass one or more computer systems, where appropriate.

This disclosure contemplates any suitable number of computer systems 1500. This disclosure contemplates computer system 1500 taking any suitable physical form. As example and not by way of limitation, computer system 1500 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 1500 may include one or more computer systems 1500; be unitary or distributed; span multiple locations; span multiple machines; span multiple data centers; or reside in a cloud, which may include one or more cloud components in one or more networks. Where appropriate, one or more computer systems 1500 may perform without substantial spatial or temporal limitation one or more steps of one or more methods described or illustrated herein. As an example and not by way of limitation, one or more computer systems 1500 may perform in real time or in batch mode one or more steps of one or more methods described or illustrated herein. One or more computer systems 1500 may perform at different times or at different locations one or more steps of one or more methods described or illustrated herein, where appropriate.

In particular embodiments, computer system 1500 includes a processor 1502, memory 1504, storage 1506, an input/output (I/O) interface 1508, a communication interface 1510, and a bus 1512. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1502 includes hardware for executing instructions, such as those making up a computer program. As an example and not by way of limitation, to execute instructions, processor 1502 may retrieve (or fetch) the instructions from an internal register, an internal cache, memory 1504, or storage 1506; decode and execute them; and then write one or more results to an internal register, an internal cache, memory 1504, or storage 1506. In particular embodiments, processor 1502 may include one or more internal caches for data, instructions, or addresses. This disclosure contemplates processor 1502 including any suitable number of any suitable internal caches, where appropriate. As an example and not by way of limitation, processor 1502 may include one or more instruction caches, one or more data caches, and one or more translation lookaside buffers (TLBs). Instructions in the instruction caches may be copies of instructions in memory 1504 or storage 1506, and the instruction caches may speed up retrieval of those instructions by processor 1502. Data in the data caches may be copies of data in memory 1504 or storage 1506 that are to be operated on by computer instructions; the results of previous instructions executed by processor 1502 that are accessible to subsequent instructions or for writing to memory 1504 or storage 1506; or any other suitable data. The data caches may speed up read or write operations by processor 1502. The TLBs may speed up virtual-address translation for processor 1502. In particular embodiments, processor 1502 may include one or more internal registers for data, instructions, or addresses. This disclosure contemplates processor 1502 including any suitable number of any suitable internal registers, where appropriate. Where appropriate, processor 1502 may include one or more arithmetic logic units (ALUs), be a multi-core processor, or include one or more processors 1502. Although this disclosure describes and illustrates a particular processor, this disclosure contemplates any suitable processor.

In particular embodiments, memory 1504 includes main memory for storing instructions for processor 1502 to execute or data for processor 1502 to operate on. As an example and not by way of limitation, computer system 1500 may load instructions from storage 1506 or another source (such as another computer system 1500) to memory 1504. Processor 1502 may then load the instructions from memory 1504 to an internal register or internal cache. To execute the instructions, processor 1502 may retrieve the instructions from the internal register or internal cache and decode them. During or after execution of the instructions, processor 1502 may write one or more results (which may be intermediate or final results) to the internal register or internal cache. Processor 1502 may then write one or more of those results to memory 1504. In particular embodiments, processor 1502 executes only instructions in one or more internal registers or internal caches or in memory 1504 (as opposed to storage 1506 or elsewhere) and operates only on data in one or more internal registers or internal caches or in memory 1504 (as opposed to storage 1506 or elsewhere). One or more memory buses (which may each include an address bus and a data bus) may couple processor 1502 to memory 1504. Bus 1512 may include one or more memory buses, as described in further detail below. In particular embodiments, one or more memory management units (MMUs) reside between processor 1502 and memory 1504 and facilitate accesses to memory 1504 requested by processor 1502. In particular embodiments, memory 1504 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1504 may include one or more memories 1504, where appropriate. Although this disclosure describes and illustrates particular memory, this disclosure contemplates any suitable memory.

In particular embodiments, storage 1506 includes mass storage for data or instructions. As an example and not by way of limitation, storage 1506 may include a hard disk drive (HDD), a floppy disk drive, flash memory, an optical disc, a magneto-optical disc, magnetic tape, or a Universal Serial Bus (USB) drive or a combination of two or more of these. Storage 1506 may include removable or non-removable (or fixed) media, where appropriate. Storage 1506 may be internal or external to computer system 1500, where appropriate. In particular embodiments, storage 1506 is non-volatile, solid-state memory. In particular embodiments, storage 1506 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1506 taking any suitable physical form. Storage 1506 may include one or more storage control units facilitating communication between processor 1502 and storage 1506, where appropriate. Where appropriate, storage 1506 may include one or more storages 1506. Although this disclosure describes and illustrates particular storage, this disclosure contemplates any suitable storage.

In particular embodiments, I/O interface 1508 includes hardware, software, or both, providing one or more interfaces for communication between computer system 1500 and one or more I/O devices. Computer system 1500 may include one or more of these I/O devices, where appropriate. One or more of these I/O devices may enable communication between a person and computer system 1500. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1508 for them. Where appropriate, I/O interface 1508 may include one or more device or software drivers enabling processor 1502 to drive one or more of these I/O devices. I/O interface 1508 may include one or more I/O interfaces 1508, where appropriate. Although this disclosure describes and illustrates a particular I/O interface, this disclosure contemplates any suitable I/O interface.

In particular embodiments, communication interface 1510 includes hardware, software, or both providing one or more interfaces for communication (such as, for example, packet-based communication) between computer system 1500 and one or more other computer systems 1500 or one or more networks. As an example and not by way of limitation, communication interface 1510 may include a network interface controller (NIC) or network adapter for communicating with an Ethernet or any other wire-based network or a wireless NIC (WNIC) or wireless adapter for communicating with a wireless network, such as a WI-FI network. This disclosure contemplates any suitable network and any suitable communication interface 1510 for it. As an example and not by way of limitation, computer system 1500 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1500 may communicate with a wireless PAN (WPAN) (such as, for example, a Bluetooth WPAN), a WI-FI network, a WI-MAX network, a cellular telephone network (such as, for example, a Global System for Mobile Communications (GSM) network), or any other suitable wireless network or a combination of two or more of these. Computer system 1500 may include any suitable communication interface 1510 for any of these networks, where appropriate. Communication interface 1510 may include one or more communication interfaces 1510, where appropriate. Although this disclosure describes and illustrates a particular communication interface, this disclosure contemplates any suitable communication interface.

In particular embodiments, bus 1512 includes hardware, software, or both coupling components of computer system 1500 to each other. As an example and not by way of limitation, bus 1512 may include an Accelerated Graphics Port (AGP) or any other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1512 may include one or more buses 1512, where appropriate. Although this disclosure describes and illustrates a particular bus, this disclosure contemplates any suitable bus or interconnect.

Herein, a computer-readable non-transitory storage medium or media may include one or more semiconductor-based or other types of integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

To the extent applicable to the present technology, gathering and use of data available from various sensors of the micromobility vehicles (or personal mobility vehicles) can be used to provide services for riders. The present disclosure contemplates that in some instances, this gathered data may include data that is associated with a person. The present disclosure recognizes that the use of such data, in the present technology, can be used to the benefit of riders. For example, the data can be used to determine whether the actions of a rider of a micromobility vehicle complies with local municipal laws and regulations and terms of service for entities that may operate or manage the micromobility vehicles.

The present disclosure contemplates entities that may perform the collection, analysis, disclosure, transfer, storage, or other use of such data will comply with well-established privacy policies and/or privacy practices. In particular, such entities should implement and consistently use privacy policies and practices that are generally recognized as meeting or exceeding industry or governmental requirements for maintaining personal data private and secure. Personal information from riders should be collected for legitimate and reasonable uses of the entity and not shared or sold outside of those legitimate uses.

Further, such entities can subject themselves to evaluation by third parties to certify their adherence to accepted privacy policies and practices. In addition, privacy policies and practices should be adapted for the particular types of personal information data being collected and/or accessed and adapted to applicable laws and standards, including jurisdiction-specific considerations.

The present disclosure also contemplates examples in which riders may selectively block the use of, or access to, personal information data. That is, the present disclosure contemplates that hardware and/or software elements can be provided to prevent or block access to such personal information data. In addition to providing "opt in" and "opt out" options, the present disclosure contemplates providing notifications relating to the access or use of personal information.

Moreover, it is the intent of the present disclosure that personal information data should be managed and handled in a way to minimize risks of unintentional or unauthorized access or use. Risk can be minimized by limiting the collection of data and deleting data once it is no longer needed De-identification may be facilitated, when appropriate, by removing specific identifiers, controlling the amount or specificity of data stored, controlling how data is stored, and/or other methods.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by a computing system:
collecting, over a time period, first ride data associated with a user riding a personal mobility vehicle, wherein collecting the first ride data comprises collecting a first plurality of current values of an electric motor of the personal mobility vehicle and a first plurality of speeds of the personal mobility vehicle, the collected first plurality of current values and the collected first plurality of speeds being collected at a plurality of instances in time;
associating each of the collected first plurality of current values with a respective one of a first plurality of speed ranges for the personal mobility vehicle generated based on the collected first plurality of speeds;
collecting second ride data associated with the user riding a current personal mobility vehicle after the time period, wherein collecting the second ride data comprises collecting a second plurality of current values of an electric motor of the current personal mobility vehicle and a second plurality of speeds of the current personal mobility vehicle;
associating each of the collected second plurality of current values with a respective one of a second plurality of speed ranges for the current personal mobility vehicle generated based on the collected second plurality of speeds;
comparing (a) the associations of the collected first plurality of current values with the respective ones of the first plurality of speed ranges with (b) the associations of the collected second plurality of current values with the respective ones of the second plurality of speed ranges; and
identifying the user riding the current personal mobility vehicle as one of a single rider or a tandem rider based on the comparison.

2. The method of claim 1, further comprising:
in response to identifying the user riding the current personal mobility vehicle as one of the single rider or the tandem rider, sending instructions to the personal mobility vehicle to perform one or more actions.

3. The method of claim 2, wherein the one or more actions comprise notifying the user of tandem riding or consequences associated with the tandem riding.

4. The method of claim 2, wherein the one or more actions comprise jamming or restricting movement of the personal mobility vehicle.

5. The method of claim 1, wherein identifying the user riding the current personal mobility vehicle as one of the single rider or the tandem rider further comprises:
determining whether an approximate load of the user riding the current personal mobility vehicle is greater or less than a threshold associated with the user riding the personal mobility vehicle.

6. The method of claim 5, further comprising identifying the user riding the current personal mobility vehicle as the single rider when the approximate load is less than the threshold.

7. The method of claim 5, further comprising identifying the user riding the current personal mobility vehicle as the tandem rider when the approximate load is greater than the threshold.

8. The method of claim 5, further comprising calculating the approximate load by estimating one or more of an aero force, an inertial force, a rolling resistance force, or a grade force, wherein the grade force is estimated based on a predefined elevation map.

9. The method of claim 1, further comprising:
filtering out portions of the first ride data or the second ride data that lead to error in load calculation.

10. The method of claim 1, wherein the first ride data or the second ride data comprise sensor data from one or more sensors of the personal mobility vehicle or the current personal mobility vehicle, respectively.

11. The method of claim 10, wherein the one or more sensors comprise an orientation sensor, a motor current sensor, a speed sensor, an accelerometer, a gyroscope, or a GPS sensor.

12. The method of claim 1, wherein the personal mobility vehicle is a scooter.

13. The method of claim 1, wherein associating each of the collected first plurality of current values with a respective one of the first plurality of speed ranges further comprises:

filtering the collected first plurality of current values into upper and lower speed boundaries;

generating, based at least in part on the upper and lower speed boundaries, a plurality of speed bins, wherein each speed bin of the plurality of speed bins corresponds to a respective one the first plurality of speed ranges; and inputting each of the filtered collected first plurality of current values into a respective one of the plurality of speed bins.

14. The method of claim 1, wherein associating each of the collected second plurality of current values with a respective one of the second plurality of speed ranges further comprises:

filtering the collected second plurality of current values into upper and lower speed boundaries;

generating, based at least in part on the upper and lower speed boundaries, a plurality of speed bins, wherein each speed bin of the plurality of speed bins corresponds to a respective one the second plurality of speed ranges; and inputting each of the filtered collected second plurality of current values into a respective one of the plurality of speed bins.

15. A personal mobility vehicle comprising:

one or more sensors configured to measure first ride data associated with a user riding the personal mobility vehicle, wherein the first ride data comprises a first plurality of current values of an electric motor of the personal mobility vehicle and a first plurality of speeds of the personal mobility vehicle, the first plurality of current values and the first plurality of speeds being collected at a plurality of instances in time; and a computer system communicatively coupled to the one or more sensors and configured to:

associate each of the first plurality of current values with a respective one of a first plurality of speed ranges for the personal mobility vehicle generated based on the first plurality of speeds;

collect second ride data associated with the user riding a current personal mobility vehicle, wherein collecting the second ride data comprises collecting a second plurality of current values of an electric motor of the current personal mobility vehicle and a second plurality of speeds of the current personal mobility vehicle;

associate each of the collected second plurality of current values with a respective one of a second plurality of speed ranges for the current personal mobility vehicle generated based on the collected second plurality of speeds;

compare (a) the associations of the collected first plurality of current values with the respective ones of the first plurality of speed ranges with (b) the associations of the collected second plurality of current values with the respective ones of the second plurality of speed ranges; and identify the user riding the current personal mobility vehicle as one of a single rider or a tandem rider based on the comparison.

16. The personal mobility vehicle of claim 15, further comprising:

a user interface module configured to send one or more notifications on a display device of the personal mobility vehicle in response to identifying the user riding the current personal mobility vehicle as a tandem rider.

17. The personal mobility vehicle of claim 15, further comprising:

a controller configured to perform one or more actions in response to identifying the user riding the current personal mobility vehicle as a tandem rider.

18. The personal mobility vehicle of claim 17, wherein the one or more actions comprise the controller triggering an alarm or a sound alert to warn the user riding the current personal mobility vehicle.

19. The personal mobility vehicle of claim 17, wherein the one or more actions comprise the controller applying brakes on the personal mobility vehicle to restrict movement of the personal mobility vehicle.

20. A system comprising: one or more processors and one or more computer-readable non-transitory storage media, the one or more computer-readable non-transitory storage media comprising instructions operable when executed by the one or more processors to cause the system to perform operations comprising:

collecting, over a time period, first ride data associated with a user riding a personal mobility vehicle, wherein collecting the first ride data comprises collecting a first plurality of current values of an electric motor of the personal mobility vehicle and a first plurality of speeds of the personal mobility vehicle, the collected first plurality of current values and the collected first plurality of speeds being collected at a plurality of instances in time;

associating each of the collected first plurality of current values with a respective one of a first plurality of speed ranges for the personal mobility vehicle generated based on the collected first plurality of speeds;

collecting second ride data associated with the user riding a current personal mobility vehicle after the time period, wherein collecting the second ride data comprises collecting a second plurality of current values of an electric motor of the current personal mobility vehicle and a second plurality of speeds of the current personal mobility vehicle;

associating each of the collected second plurality of current values with a respective one of a second plurality of speed ranges for the current personal mobility vehicle generated based on the collected second plurality of speeds;

comparing (a) the associations of the collected first plurality of current values with the respective ones of the first plurality of speed ranges with (b) the associations of the collected second plurality of current values with the respective ones of the second plurality of speed ranges; and identifying the user riding the current personal mobility vehicle as one of a single rider or a tandem rider based on the comparison.

* * * * *